United States Patent [19]

Tanaka

[11] Patent Number: 5,513,178
[45] Date of Patent: Apr. 30, 1996

[54] CELL MULTIPLEXING APPARATUS IN ATM NETWORK

[75] Inventor: Kenji Tanaka, Kawasaki, Japan

[73] Assignee: Fujitsu Limited, Kanagawa, Japan

[21] Appl. No.: 189,407

[22] Filed: Jan. 31, 1994

[30] Foreign Application Priority Data

May 19, 1993 [JP] Japan .................................. 5-117189

[51] Int. Cl.$^6$ .............................. H04J 3/02; H04L 12/64
[52] U.S. Cl. .......................... 370/58.2; 370/60.1; 370/79; 370/94.2; 370/112
[58] Field of Search ................................. 370/58.2, 58.3, 370/60, 79, 94.1, 112, 60.1, 94.2

[56] References Cited

U.S. PATENT DOCUMENTS 4,999,835  3/1991  Lagoutte ................................ 370/94.1
5,339,318  8/1994  Tanaka et al. ..................... 370/58.2 X Primary Examiner—Douglas W. Olms
Assistant Examiner—Russell W. Blum

[57] ABSTRACT

A cell multiplexing apparatus includes a transmitting section in which information fields of a plurality of ATM cells intended for transmission along the same path are multiplexed and stored into an information field of one multiplexed cell. A representative VPI, globally representing the VPIs of the plurality of ATM cells intended for transmission along the same path, is assigned as the VPI of the multiplexed cell for transmission. A receiving section detects the representative VPI from received cells and the plurality of ATM cells having individual VPIs and transmitted along the same path are reconstructed from the multiplexed cell having the representative VPI. The VPI area of the ATM header of the multiplexed cell is divided into two segments. The representative VPI designating the path for the multiplexed cell is carried in one segment and VPI information of the plurality of ATM cells intended for transmission along the same path is carried in the other segment.

18 Claims, 25 Drawing Sheets

CELL MULTIPLEXING APPARATUS IN ATM NETWORK

BACKGROUND OF THE INVENTION

1. Field of the Invention

The present invention relates to a cell multiplexing apparatus for asynchronous transfer mode (ATM) communication, and more particularly to a cell multiplexing apparatus for multiplexing cells having different virtual path identifiers (VPIs) along the same path into one multiplexed cell at a node-to-network interface (NNI). In this specification, cell multiplexing means multiplexing information cells from a plurality of channels into one cell.

2. Description of the Related Art

In recent years, B-ISDN (Broadband Integrated-Services Digital Network) has emerged as the next generation public network, and with the implementation of the B-ISDN, even more flexible broadband communication networks are being realized which can provide such services as voice communications, very high-speed file transfer, information communications, communications between LANs, moving image transmission, and even moving image services for high-definition television (HDTV). ATM communication technology that can handle such multimedia is used in B-ISDN.

In ATM communication, high-speed asynchronous transmission is performed using ATM cells, and when communication path congestion is encountered, the CLP control bit in each ATM cell is checked and ATM cells whose CLPs are "1" are preferentially discarded. Further, cell multiplexing is performed to prevent such communication path congestion and also to increase cell utilization. For example, when transmitting voice cells constructed by assembling PCM voice code data at 64 Kb/s into ATM cells, the amount of voice data that can be carried in one voice cell is limited because of the associated time delay; as an example, if the allowable delay time is 0.5 ms, voice information that can be carried in one voice cell is only four bytes of data, i.e., 0.5 ms (delay time) / 125 μs (8 kHz sampling)=4 samples.

The above technique of cell multiplexing is such that in transmission of voice cells of a plurality of voice channels, if the cells have the same VPI between them, the voice information carried in these cells is merged and stored in an information field of one multiplexed cell, and a VPI common to the voice channels is appended to the VPI of the multiplexed cell for transmission. For example, if one cell can contain 40-octets of user information, it follows that in the above example, voice information for 10 channels (10 voice cells) can be combined into one multiplexed cell. Thus, the probability of occurrence of communication path congestion decreases because of the reduced number of voice cells (from 10 voice cells to one multiplexed cell). Furthermore, since voice information for multiple channels is carried in one multiplexed cell for transmission, cell utilization increases with an increasing degree of multiplexing (utilization of the information field is increased from four octets to 40 octets).

The above-described cell multiplexing has been known in the prior art, i.e, a plurality of cells having the same VPI for transmission along the same path from an user network interface (UNI) is assembled into one multiplexed cell. However, it has not been practiced to multiplex cells with different VPIs into one multiplexed cell at each node in an ATM network; the only technique employed to handle such a situation has been the so-called statistical multiplexing whereby the cells are simply distributed to the paths designated by their VPIs (empty cells used for cell synchronization within the network are asynchronously replaced by information cells). This is because when the VPIs are different, the paths over which the cells are to be transmitted may be different. Suppose that, in such a case, the above-described cell multiplexing were performed unconditionally at each communication node without checking the identity of the VPIs. Then, the intermediate node that received the multiplexed cell would have to disassemble the multiplexed cell, determine the destination of each individual cell contained in the 10 multiplexed cell, and then reassemble the cells into a multiplexed cell for transmission. This would not only increase the transmission delay associated with cell multiplexing but also add to the load at each node.

However, the VPI of each cell is usually assigned for each user network interface (UNI), and there are cases in which different VPIs from different UNIs may designate the same path. Furthermore, when the number of channels designated by one VPI is increased, different VPIs may be assigned to designate the same path from the standpoint of network management. This is also true when the number of user network interfaces (UNIs) connected to the network is increased (which is equivalent to increasing the number of channels). In these cases, the VPIs of individual cells are different but designate the same path, and no problems occur with the above cell multiplexing. Furthermore, since these cases arise due to increased number of channels, etc., as noted above, by positively utilizing the technique of cell multiplexing the effects of cell multiplexing, such as reducing the possibility of congestion and increasing the cell utilization efficiency, can be further enhanced.

SUMMARY OF THE INVENTION

It is accordingly an object of the invention to provide a cell multiplexing apparatus wherein, using a facility for managing the VPIs of the cells intended for transmission along the same path, the assignment of the VPIs between NNIs is controlled so that the cells intended for transmission along the same path are multiplexed by assigning a representative VPI representing these cells even when the cells have different VPIs between them.

It is another object of the invention to provide a cell multiplexing apparatus wherein a facility for predicting the occurrence of congestion is added to the above-described cell multiplexing apparatus and, in order to reduce cell transmission delays, cell multiplexing is usually not performed, but performed only when the occurrence of congestion is predicted.

According to the present invention, there is provided a cell multiplexing apparatus in an ATM network, comprising: transmitting means 1 in which the information fields of a plurality of ATM cells intended for transmission along the same path are multiplexed and stored into an information field of one multiplexed cell and a representative VPI globally representing the VPIs, including different VPIs, of the plurality of ATM cells intended for transmission along the same path is assigned as the VPI of the multiplexed cell for transmission; and receiving means 2 in which the representative VPI is detected from received cells and the plurality of ATM cells having individual VPIs and transmitted along the same path are reconstructed from the multiplexed cell having the representative VPI.

In one mode of the invention, the VPI area of the ATM header of the multiplexed cell is divided into two segments so that the representative VPI is carried in one segment and VPI information of the plurality of ATM cells intended for transmission along the same path is carried in the other segment, and the path distribution for the multiplexed cell is done in accordance with the representative VPI; further, the transmitting means 1 includes congestion predicting means for predicting the occurrence of congestion from the relationship between the number of input cells and the number of output cells, and the multiplexed cell is assembled and sent out only when the occurrence of congestion is predicted.

BRIEF DESCRIPTION OF THE DRAWINGS

The present invention will be more clearly understood from the description as set forth below with reference to the accompanying drawings wherein.

DESCRIPTION OF THE PREFERRED EMBODIMENTS

Before describing the preferred embodiments according to the present invention, examples of the related art are provided with reference to accompanying drawings FIGS. 1 to 4.

Figure 1:
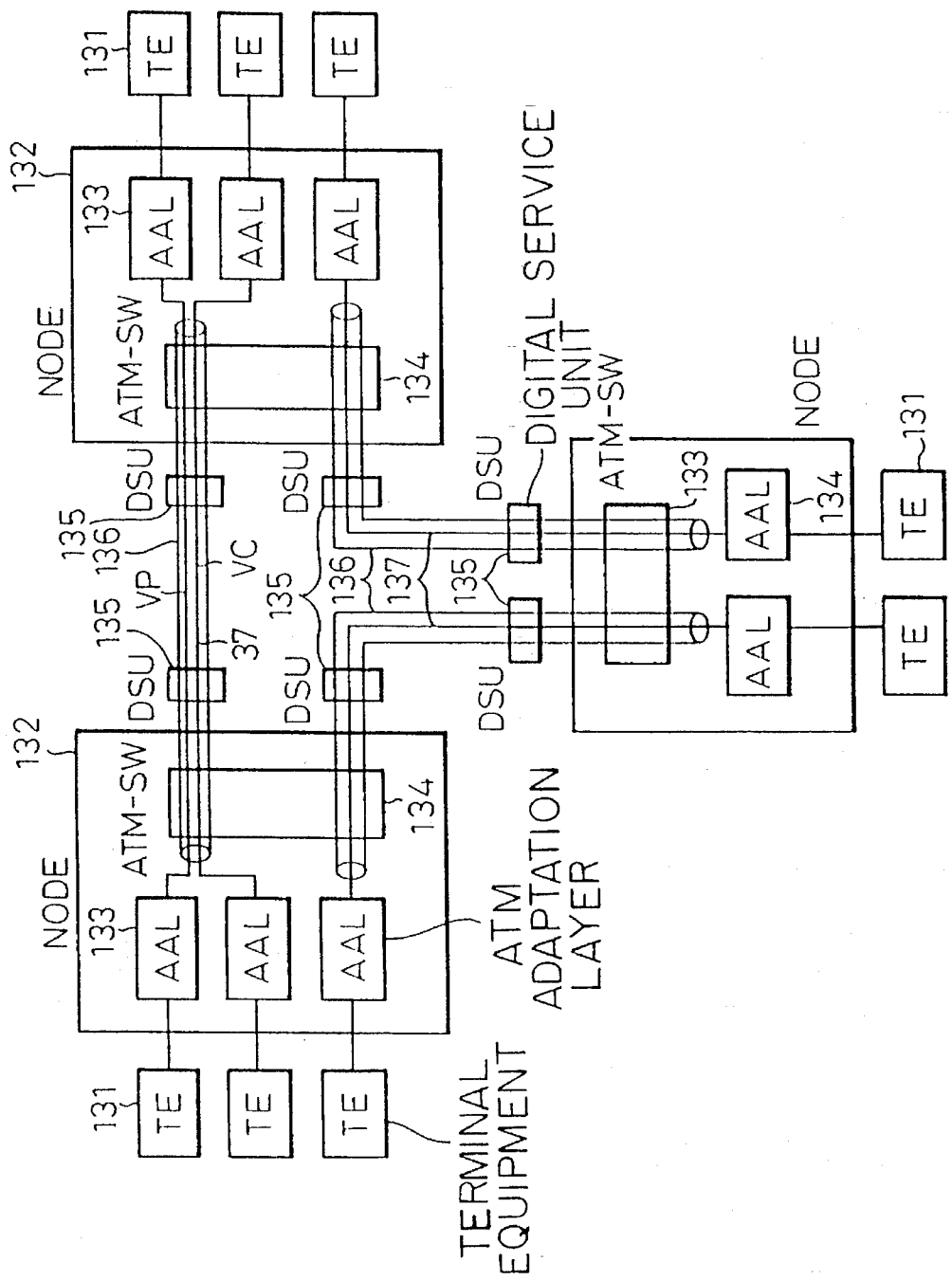
FIG. 1 is a diagram showing an example of an ATM network configuration.

FIG. 1 is a schematic diagram illustrating how communications are performed between nodes in a B-ISDN.

In FIG. 1, user terminals 131 are connected to communication nodes 132 via respective user network interfaces (UNIs). High speed asynchronous transmission using ATM cells is performed between the communication nodes via node-to-network interfaces (NNIs) and digital service units (DSUs). Each communication node 132 contains ATM adaptation layers (AALs) 133 and ATM switches 134. The AAL 133 is responsible for ATM cell assembly and disassembly between the user terminal 131 and the ATM switch 134. Data from the user terminal 131 is broken up into a plurality of ATM cells which are then transferred via the ATM switch 134.

Figure 2:
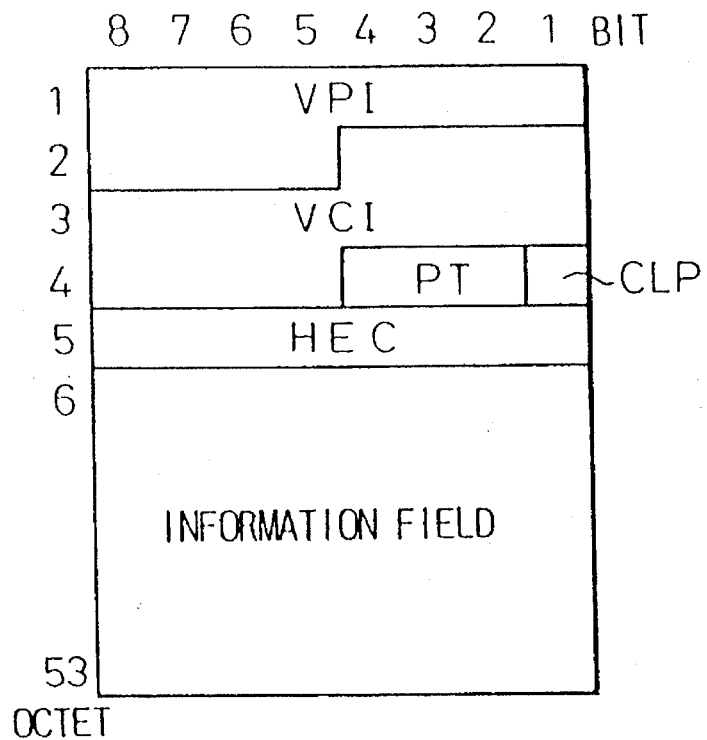
FIG. 2 is a diagram showing the structure of an ATM cell at NNI.
Figure 3:
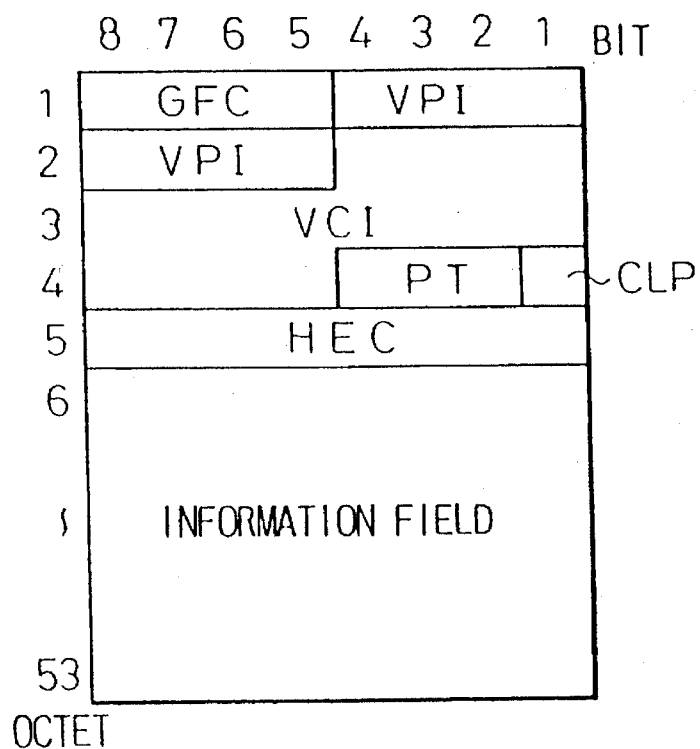
FIG. 3 is a diagram showing the structure of an ATM cell at UNI.

FIGS. 2 and 3 show examples of ATM cells. The former (FIG. 2) shows the format of the NNI which is an interface between the communication nodes 132, and the latter (FIG. 3) shows the format of the UNI which is an interface between the user terminal 131 and the communication node 132. Each ATM cell consists of 53 octets, of which the first five octets represents the ATM header designating the communication destination and the remaining 48 octets constitute the information field carrying packetized voice, data, etc. from the terminal.

The ATM header contains a virtual path identifier (VPI) that specifies a communication path, a virtual channel identifier (VCI) that specifies a channel to be used in the specified communication path, control bits such as PT (payload type) and CLP (cell loss priority), and a CRC calculation value for HEC (header error control). The information field carries information from the terminal, such as voice, data, etc. that has been assembled into cells of 48 octets. If the information does not fill up to the 48 octets, any remainder is filled with blanks. The UNI (FIG. 3) is provided with a generic flow control (GFC) facility. The GFC is used to control contention between cells on the same physical layer connection when a plurality of terminals are connected to the user side of the UNI. The GFC is therefore not provided in the NNI (FIG. 2).

Referring back to FIG. 1, data from each terminal 131 is assembled into cells by the AAL 133 and a communication path is set up by the ATM switch 134. Using the header data in each ATM cell, the ATM switch 134 performs the high speed switching operation by hardware which is the feature of ATM. FIG. 1 illustrates how the user terminals 131 connected to the respective communication nodes 132 communicate with each other over communication paths, i.e. virtual paths (VPs) 136 and virtual channels (VCs) 137 specified therein. If communication path congestion is detected by the ATM switch section 134 during communication, the ATM switch 134 discards part of the data transmitted from the transmitting user terminal 131. In this case, the ATM switch 134 checks the CLP control bit in the ATM cell format (FIGS. 2, 3) and preferentially discards cells whose CLP value is "1".

Cell multiplexing is performed to avoid congestion of the communication path and also to increase cell utilization. For example, when transmitting voice cells constructed by assembling PCM voice code data of 64 Kb/s into ATM cells, the amount of voice data that can be carried in one voice cell is limited because of the associated time delay; as an example, if the allowable delay time is 0.5 ms, the voice information that can be carried in one voice cell is only four bytes of data, i.e., 0.5 ms (delay time) / 125 μs (8 kHz sampling)=4 samples. The above technique of cell multiplexing is such that in transmission of voice cells of a plurality of voice channels, if the cells have the same VPI between them, the voice information carried in these cells is merged and stored in an information field of one multiplexed cell, and a VPI common to the voice channels is appended to the VPI of the multiplexed cell for transmission. For example, if one cell can contain 40-octets of user information, it follows that in the above example, voice information of 10 channels (10 voice cells) can be combined into one multiplexed cell. Thus, the probability of occurrence of communication path congestion decreases because of the reduced number of voice cells (from 10 voice cells to one multiplexed cell). Furthermore, since voice information of multiple channels is carried in one multiplexed cell for transmission, cell utilization increases with increasing degree of multiplexing (utilization of the information field is increased from four octets to 40 octets).

Figure 4:
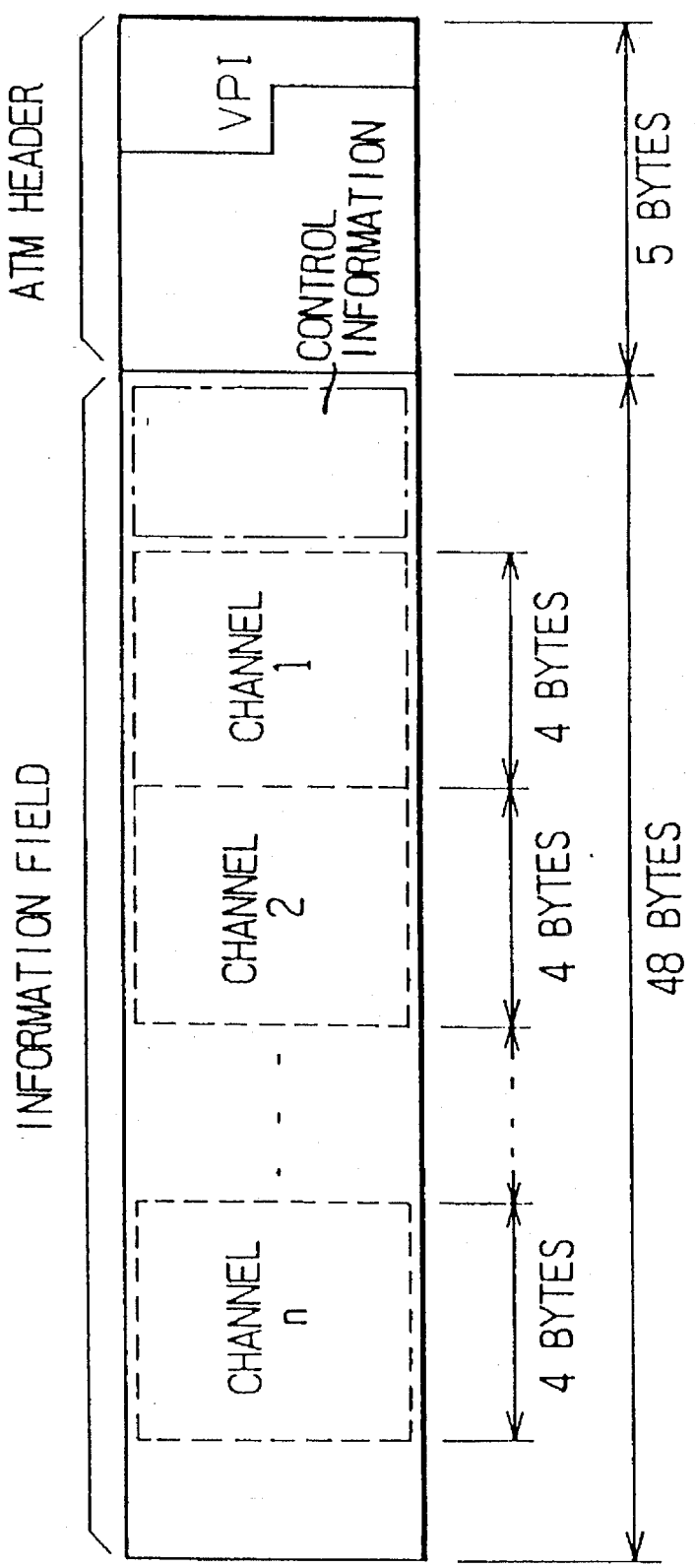
FIG. 4 is a diagram showing an example of a multiplexed cell assembled by multiplexing voice cells.

FIG. 4 illustrates an example of a multiplexed cell assembled by multiplexing voice cells such as described above. As described, the information field of the multiplexed cell accommodates the voice information of a plurality of channels that number n (n is an integer), while the control information field thereof contains, for example, address information to identify the location of each of the plurality of voice information items stored (channels 1 to n), and control information used to disassemble the multiplexed cell and reassemble the individual voice cells at the destination node. A VPI common to the plurality of channels is written in the ATM header.

The preferred embodiments of the present invention will now be described below.

Figure 5:
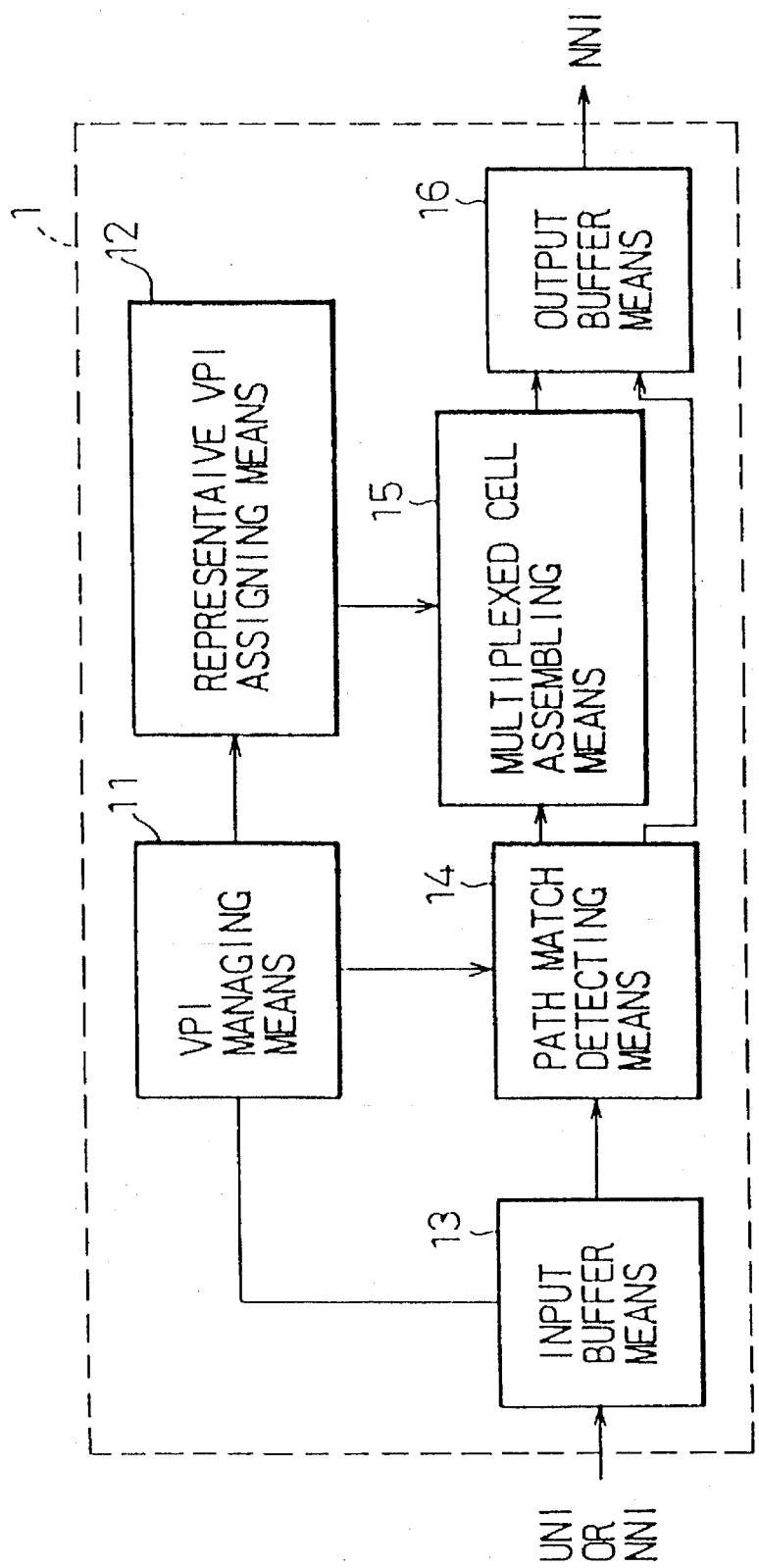
FIG. 5 is a block diagram showing the basic configuration of a transmitting section in a cell multiplexing apparatus according to the present invention.

FIG. 5 is a block diagram showing the basic configuration of a transmitting section in a cell multiplexing apparatus according to the present invention.

As shown in FIG. 5, transmitting means 1 comprises: input buffer means 13 for buffering a prescribed number of incoming cells; VPI managing means 11 for managing the VPIs of a plurality of ATM cells to be transmitted along the same path; representative VPI assigning means 12 for assigning a representative VPI representing the VPIs of the plurality of ATM cells to be transmitted along the same path; path match detecting means 14 for comparing the VPIs of the incoming cells output from the input buffer means 13 with the VPIs for the same path supplied from the VPI managing means 11, and for separating the incoming cells into matched cells for which the VPIs match and unmatched cells for which the VPIs do not match; multiplexed cell assembling means 15 for assembling a plurality of matched cells supplied from the path match detecting circuit 14 into one multiplexed cell, and for assigning the representative VPI from the representative VPI assigning means 12 as the VPI of the multiplexed cell; and output buffer means 16 for buffering the multiplexed cells from the multiplexed cell assembling means 15 and/or the unmatched cells from the path match detecting means 14.

The input buffer means 13 temporarily stores incoming cells, and when the number of incoming cells stored therein exceeds a prescribed value, it is decided that congestion is most likely to occur, and a congestion prediction signal is issued. The VPI managing means 11 manages the VPIs of a plurality of cells to be transmitted along the same path, including such cells as having different VPIs, while the representative VPI assigning means 12 assigns a representative VPI globally representing the VPIs of the plurality of cells to be transmitted along the same path. The path match detecting means 14 compares the VPI of each of the incoming cells transferred from the input buffer means 13 with the VPIs for the same path supplied from the VPI managing means 11, and separates the incoming cells into matched cells for transmission along the same path and unmatched cells for transmission along different paths.

The cells to be transmitted along the same path are supplied to the multiplexed cell assembling means 15 at the next stage, where the information fields of these cells are combined together and assembled into a multiplexed cell to which the representative VPI supplied from the VPI assigning means 12 is appended. The output buffer means 16 buffers the multiplexed cell supplied from the multiplexed cell assembling means 15 for transmission along the same path and the individual cells supplied from the path match detecting means 14 for transmission along different paths, and outputs them at prescribed timing.

Figure 6:
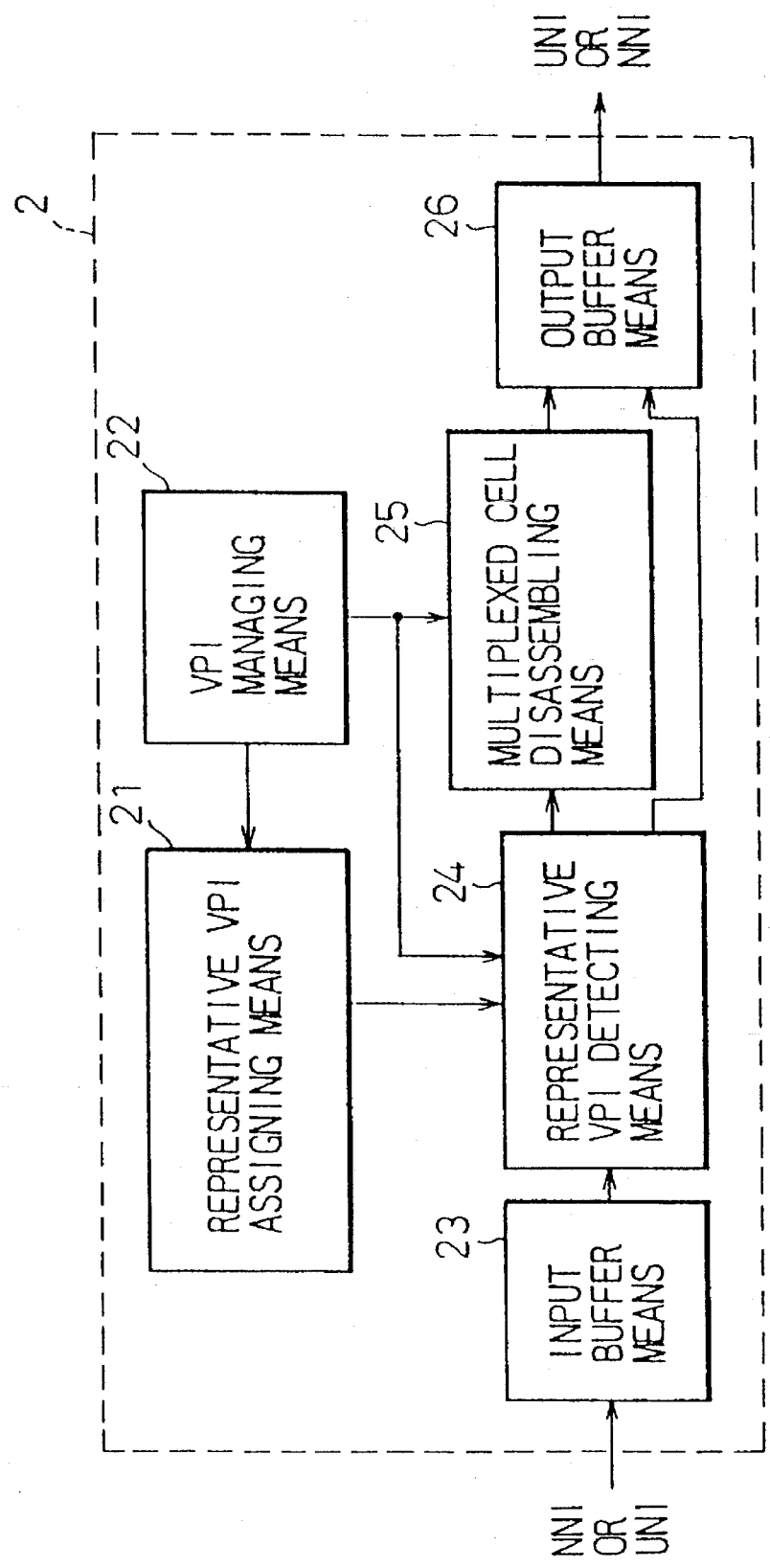
FIG. 6 is a block diagram showing the basic configuration of a receiving section in the cell multiplexing apparatus according to the present invention.

FIG. 6 is a block diagram showing the basic configuration of a receiving section in the cell multiplexing apparatus according to the present invention.

As shown in FIG. 6, receiving means 2 comprises: input buffer means 23 for buffering a prescribed number of received cells; representative VPI assigning means 21 for assigning a representative VPI for a multiplexed cell assembled from a plurality of ATM cells to be transmitted along the same path; VPI managing means 22 for managing the VPIs of the plurality of ATM cells assembled into the multiplexed cell; representative VPI detecting means 24 for comparing the VPIs of the received cells supplied from the input buffer means 23 with the representative VPI supplied from the representative VPI assigning means 21, and for separating the received cells into multiplexed cells each with a representative VPI for which the VPIs match and the other received cells for which the VPIs do not match; multiplexed cell disassembling means 25 for disassembling each matched multiplexed cells supplied from the representative VPI detecting means 24 into their component ATM cells; and output buffer means 26 for buffering the ATM cells supplied from the multiplexed cell disassembling means 25 and/or the unmatched received cells supplied from the representative VPI detecting means 24.

The input buffer means 23 buffers received cells and supplies them to the representative VPI detecting means 24 at the next stage. The representative VPI assigning means 21 and the VPI managing means 22 have functions equivalent to those of the representative VPI assigning means 12 and the VPI managing means 11 in the transmitting means 1. The representative VPI detecting means 24 separates the received cells into cells having representative VPIs and the other cells, and outputs them separately. The multiplexed cell disassembling means 25 reconstructs the individual ATM cells having original VPIs, from the information contained in the information field of the received cell having the representative VPI and also from the information supplied from the VPI managing means 22. The output buffer means 26 buffers the reconstructed ATM cells and the cells having no representative VPIs, and holds them for output.

Figure 7:
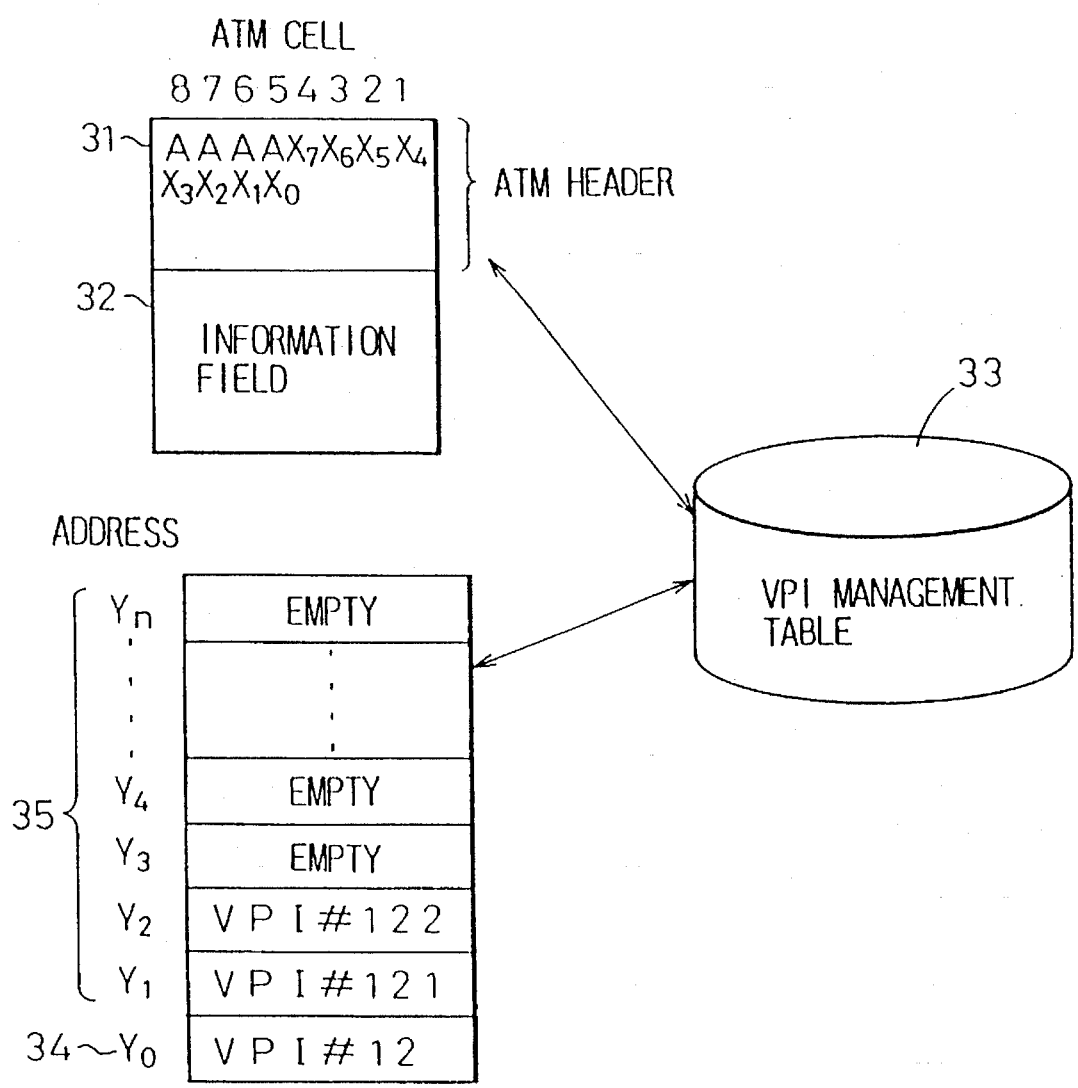
FIG. 7 is a diagram for explaining a representative VPI (1) according to the present invention.
Figure 8:
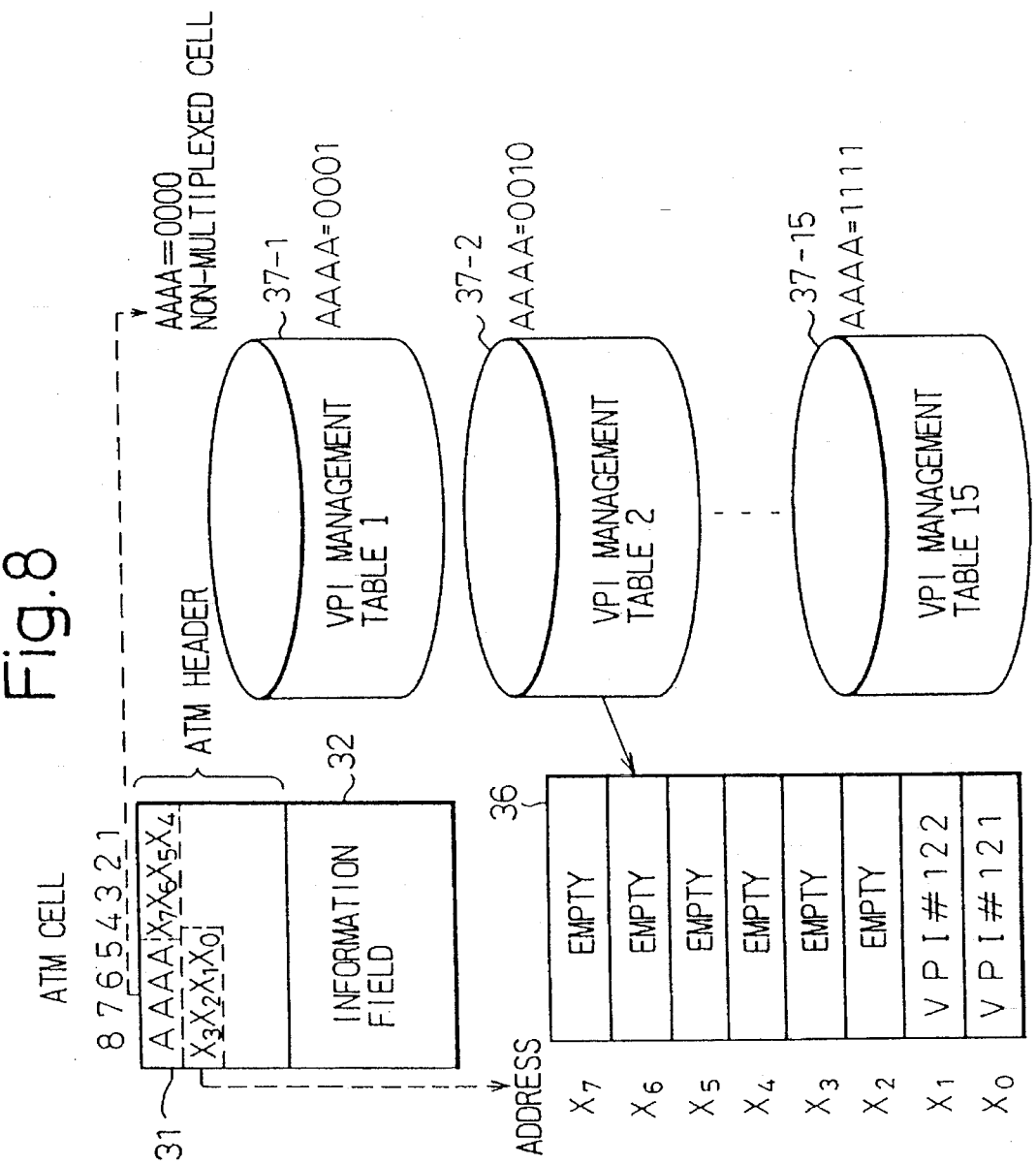
FIG. 8 is a diagram for explaining a representative VPI (2) according to the present invention.

FIGS. 7 and 8 each show a schematic diagram for explaining the construction of a representative VPI according to the present invention.

In FIG. 7, a representative VPI 34 (table address $Y_0$) is written into the ATM header 31 of an ATM cell in accordance with a VPI management table 33 contained in the VPI managing means 11 of the transmitting means 1 (FIG. 5), and individual VPI information designated by the representative VPI is written into the information field 32 of the ATM cell along with the contents of the information field of each cell multiplexed. For the individual VPI information 35, individual VPI numbers (VPI #121, VPI #122, etc. shown in FIG. 7) may be written directly, or instead, identifying information for identifying them (e.g., corresponding table addresses $Y_1$–$Y_n$) may be written.

In the receiving means 2 (FIG. 6), the representative VPI detecting means 24 detects the representative VPI 34 from the ATM header 31 of the received cell, and the individual ATM cells are reconstructed from the individual VPI information 35 (VPI #121, VPI #122, etc.) contained in the information field 32, or from the identifying information ($Y_1$–$Y_n$) by using the VPI management table 33 contained in the VPI managing means 22, as is done at the transmitting side.

According to the format of FIG. 7, it is possible to reconstruct individual ATM cells just by identifying the representative VPI number at the receiving side, in which case the VPI management table can be simplified. Furthermore, this format can be used in connectionless communications.

FIG. 8 shows the format in which the VPI area of the NNI format in the ATM header 31 is divided into two segments, one segment (which, in FIG. 8, corresponds to the GFC area (AAAA) in the UNI format) being allocated to a representative VPI and the remaining VPI area being allocated bit by bit ($X_0$–$X_7$) to the VPI information of the cells multiplexed. Since the GFC area is not used in communications between nodes, assigning the representative VPI of the invention to that area helps to maintain consistency with existing networks.

As shown in the right side of FIG. 8, AAAA=0 indicates that the cell is a normal cell that has not been multiplexed. Therefore, in the case of FIG. 8, a total of 15 representative VPIs from AAAA=1 to AAAA=15 are available for selection. Each of the VPI numbers 1 to 15 corresponds to one of 15 VPI management tables (37-1 to 37-15). The bits $X_0$–$X_7$ in each representative VPI corresponds to eight addresses in the associated VPI management table. Any one of the bits $X_0$–$X_7$ that is set to "1" indicates that the individual VPI stored at the corresponding address is used. For example, when AAAA=0010 and $X_7$–$X_8$=00000011, as shown in FIG. 8, it indicates that the representative VPI #2 is comprised of two individual VPIs #121 and #122.

The format of FIG. 8 requires the provision of representative VPIs and VPI management tables containing corresponding individual VPI information at both the transmitting and receiving sides, but since the amount of VPI information carried in a multiplexed cell is small and the processing at intermediate nodes, etc. is therefore simplified, this format has the advantage of minimizing processing time delays, etc. Furthermore, since the mapping between the representative VPIs and the groups of individual VPIs is simple, the format has the further advantage that hardware implementation is easy, thereby allowing high-speed VPI retrieval, etc.

Figure 9:
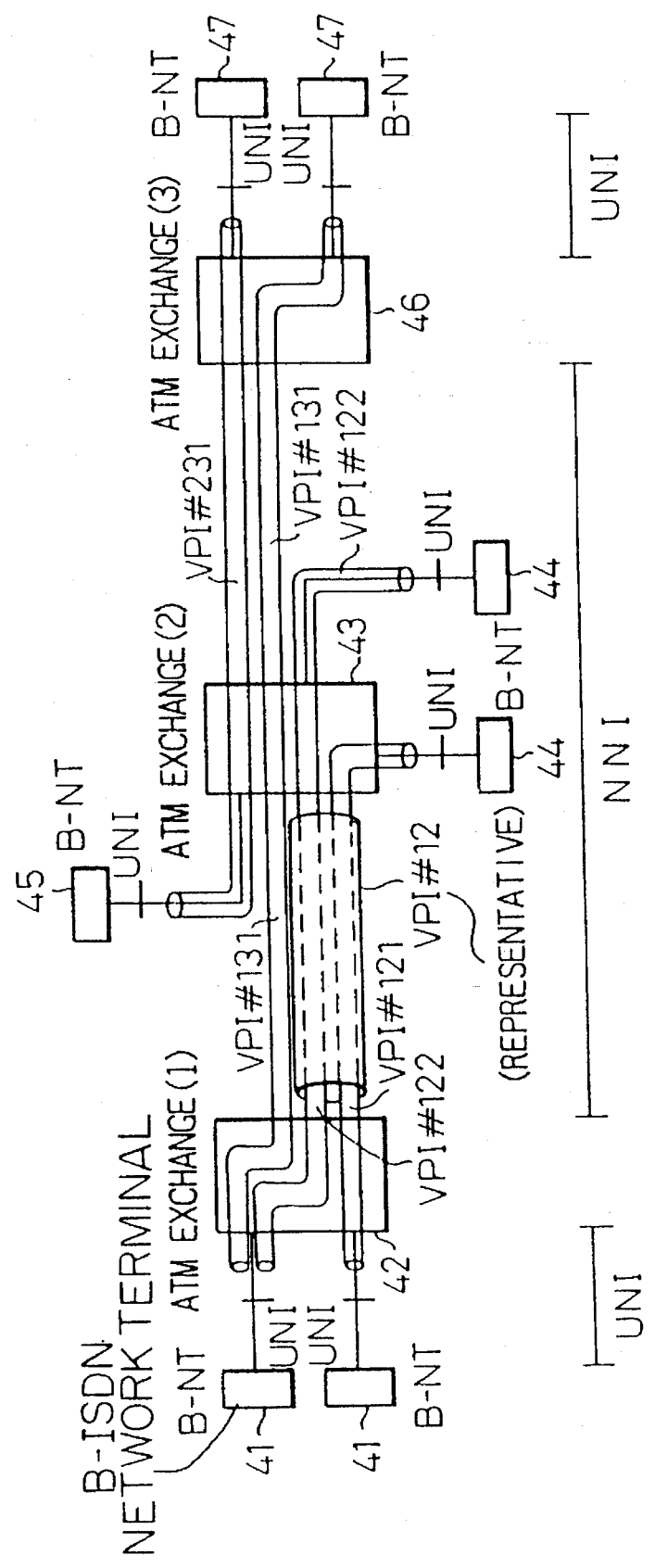
FIG. 9 is a diagram showing an example of an ATM network employing the cell multiplexing apparatus according to the present invention.

FIG. 9 shows an example of an ATM network in which the cell multiplexing apparatus of the invention is employed.

In FIG. 9, B-ISDN terminals (B-NT) 41 are connected to an ATM exchange (1) 42 via user network interfaces UNIs. The ATM exchange (1) 42 multiplexes ATM cells having VPI #121 and #122 designating transmission along the same path, and appends a representative VPI #12 to the multiplexed cell for transmission. The number #12 of the representative VPI indicates that this representative VPI designates the path leading from the ATM exchange (1) to the next ATM exchange (2). For other paths, for example, a VPI #131 designating the path leading to an ATM exchange (3) in the case of FIG. 9, cells are not multiplexed but sent out as normal ATM cells.

In the ATM exchange (2) 43, upon detecting the representative VPI #12, the individual ATM cells having the original VPIs #121 and #122 are reconstructed from the individual VPI information carried in the information field of the ATM cell having the representative VPI #12, or by referencing the VPI information contained in the VPI management table corresponding to the representative VPI #12, as described previously in connection with FIGS. 7 and 8. The reconstructed cells are then transferred to B-ISDN terminals (B-NT) 44 via respective user network interfaces UNIs. The cells with the VPI #131 designating the different path are relayed as are. In the example shown in FIG. 9, a B-ISDN terminal (B-NT) 45 is connected to the ATM exchange (2) 43 via a user network interface. Since its path VPI #231 designates the same path as the above path VPI #131, the cells can be multiplexed together as in the previous example, but FIG. 9 shows an example in which the ATM exchange (2) 43 judges that the situation does not lead to congestion of the communication path leading to the ATM exchange (3) 46, so that the cells are not multiplexed in this case.

Figure 10:
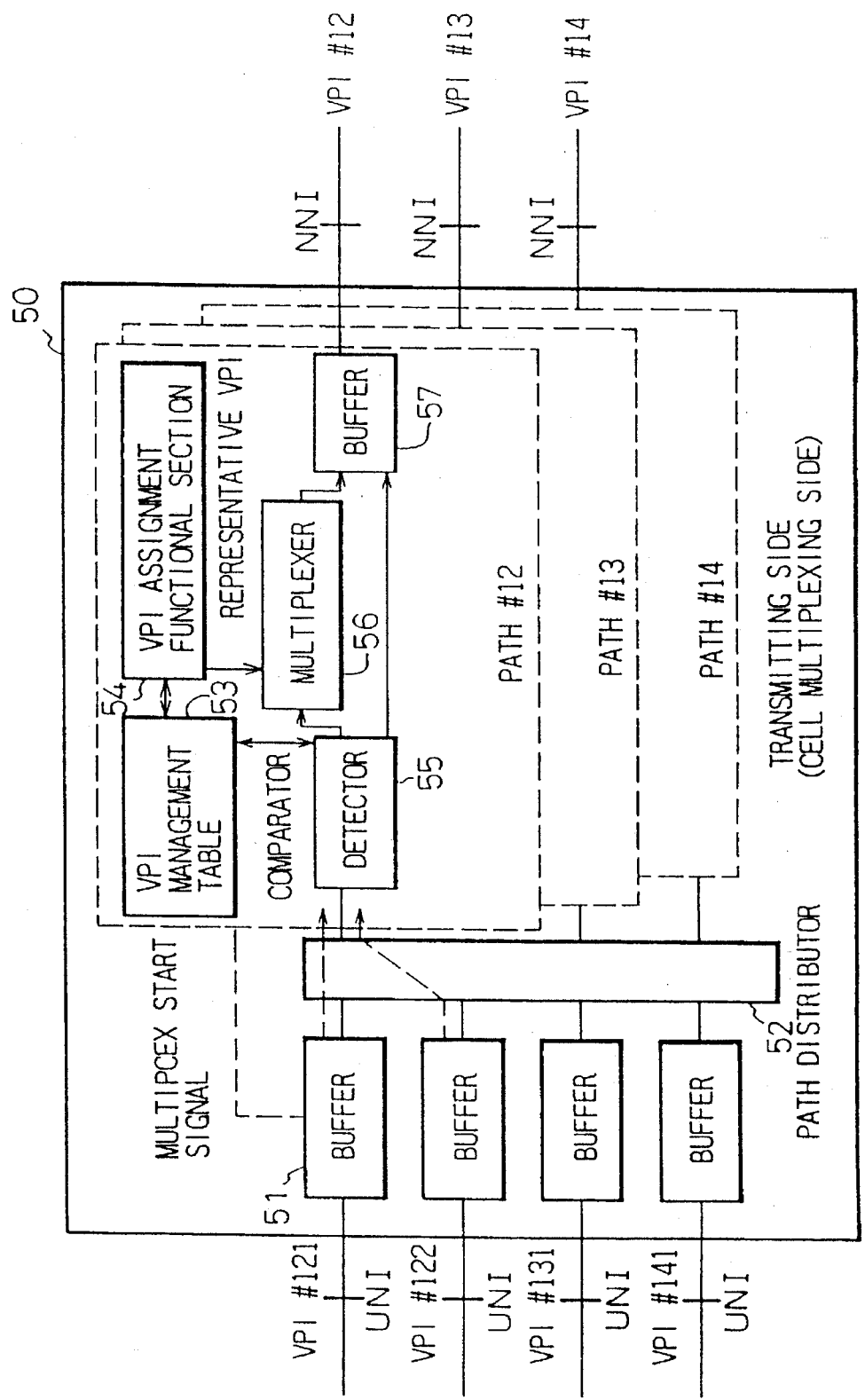
FIG. 10 is a diagram showing an embodiment of the transmitting section in the cell multiplexing apparatus according to the present invention.

FIG. 10 is a block diagram showing one embodiment of the transmitting section in the cell multiplexing apparatus according to the present invention.

In comparison with the invention shown in FIG. 5, the buffers 51 shown in FIG. 10 correspond to the input buffer means 13 of FIG. 5, and the VPI management table 53 and VPI assignment functional section 54 shown in FIG. 10 correspond to the VPI managing means 11 and representative VPI assigning means 12, respectively, shown in FIG. 5. Further, the path distributor 52 and detector 55 shown in FIG. 10 together correspond to the path match detecting means 14. The multiplexer 56 in FIG. 10 corresponds to the multiplexed cell assembling means 15 of FIG. 5, and the buffer 57 shown in FIG. 10 corresponds to the output buffer means 16 of FIG. 5.

In FIG. 10, assuming that the transmitting section 50 is used in the ATM exchange (1) shown in FIG. 9, the ATM cells received from the B-ISDN terminals 41 are input to the buffers 51 according to their path VPIs #121, #122, and #131. Using VPI tables containing fixed values stored at the time of system setup or variable values stored at the time of path setup to the destination, the VPI management table 53 controls the path distributor 52 comprised of ATM switches and distributes the incoming cells to the respective common paths (#12X, #13X, etc.).

In the detector 55, the VPI numbers of the distributed cells are compared with the VPI numbers supplied from the VPI management table 53 for multiplexing onto the designated path; the cells for which the VPI numbers match are transferred to the multiplexer 56 at the next stage, while the cells for which the VPI numbers do not match are passed directly to the buffer 57. In the example shown in FIG. 10, VPI #121 and VPI #122 are given from the VPI management table 53 as the VPI group to be multiplexed, so that the incoming cells having the VPI #121 or #122 are transferred to the multiplexer 56 as matched cells. The VPI assignment functional section 54 supplies the representative VPI number (VPI #12) representing the multiplex VPI group to the multiplexer 56. The multiplexer 56 then assembles a multiplexed cell with the representative VPI written to the VPI field of its ATM header and the information contents of the matched cells written to its information field, and transfers the thus assembled multiplexed cell to the buffer 57 at the next stage. The buffer 57 also holds the non-multiplexed cells directly passed from the detector 55, and the multiplexed and non-multiplexed cells are sequentially output at the prescribed cell transmit timing.

Figure 11:
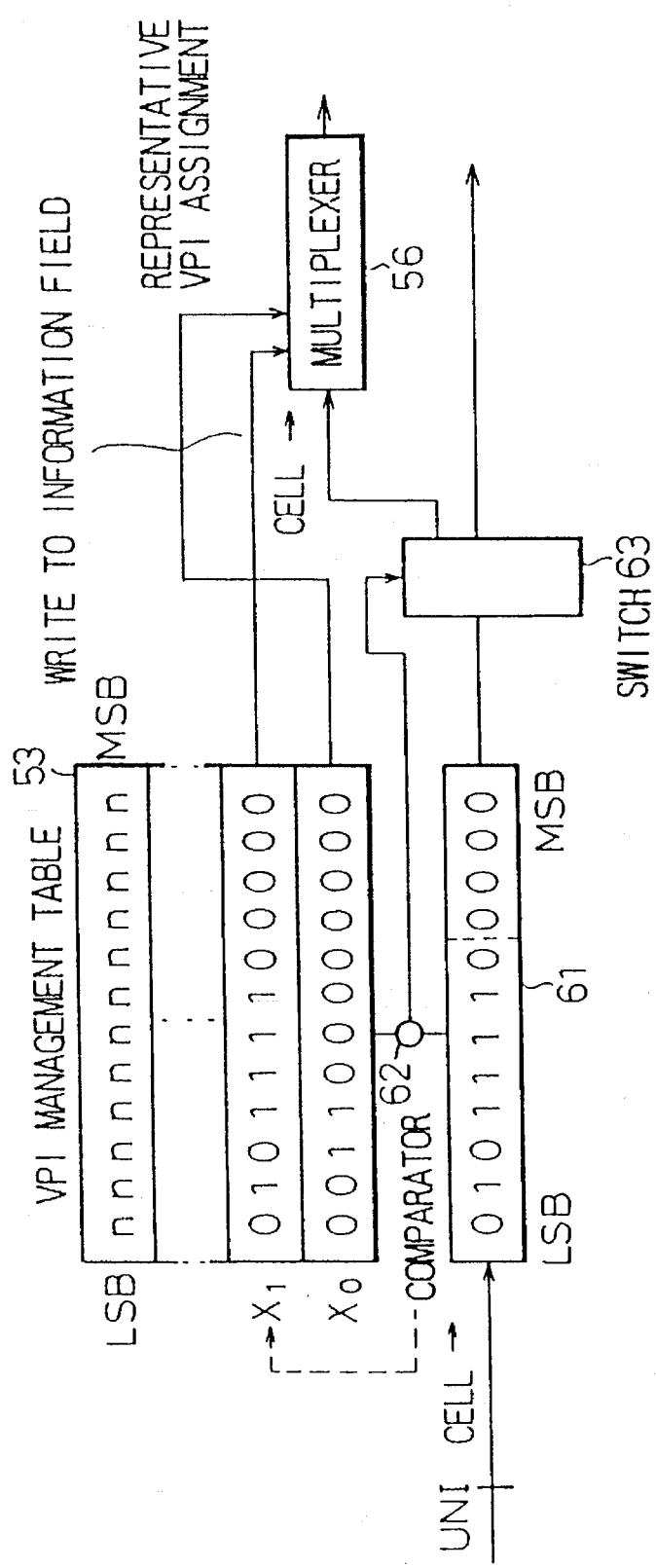
FIG. 11 is a diagram for explaining the operation of a detector at the transmitting side when the representative VPI (1) shown in FIG. 7 is used.

FIG. 11 is a diagram for explaining the operation of the detector 55 when the representative VPI (1) shown in FIG. 7 is used.

The example of FIG. 11 shows a case in which an ATM cell having the VPI #122 arrives and the VPI (#122) carried in its ATM header is input to a register 61. A comparator 62 compares the VPI held in the register 61 with each VPI stored in the VPI management table 53, and detects a match with #122 at table address X1, upon which a switch 63 at the subsequent stage is set to connect to the multiplexer 56. At the same time, the representative VPI #12 stored at address $X_0$ in the VPI management table 53 is supplied to the multiplexer 56.

Figure 12:
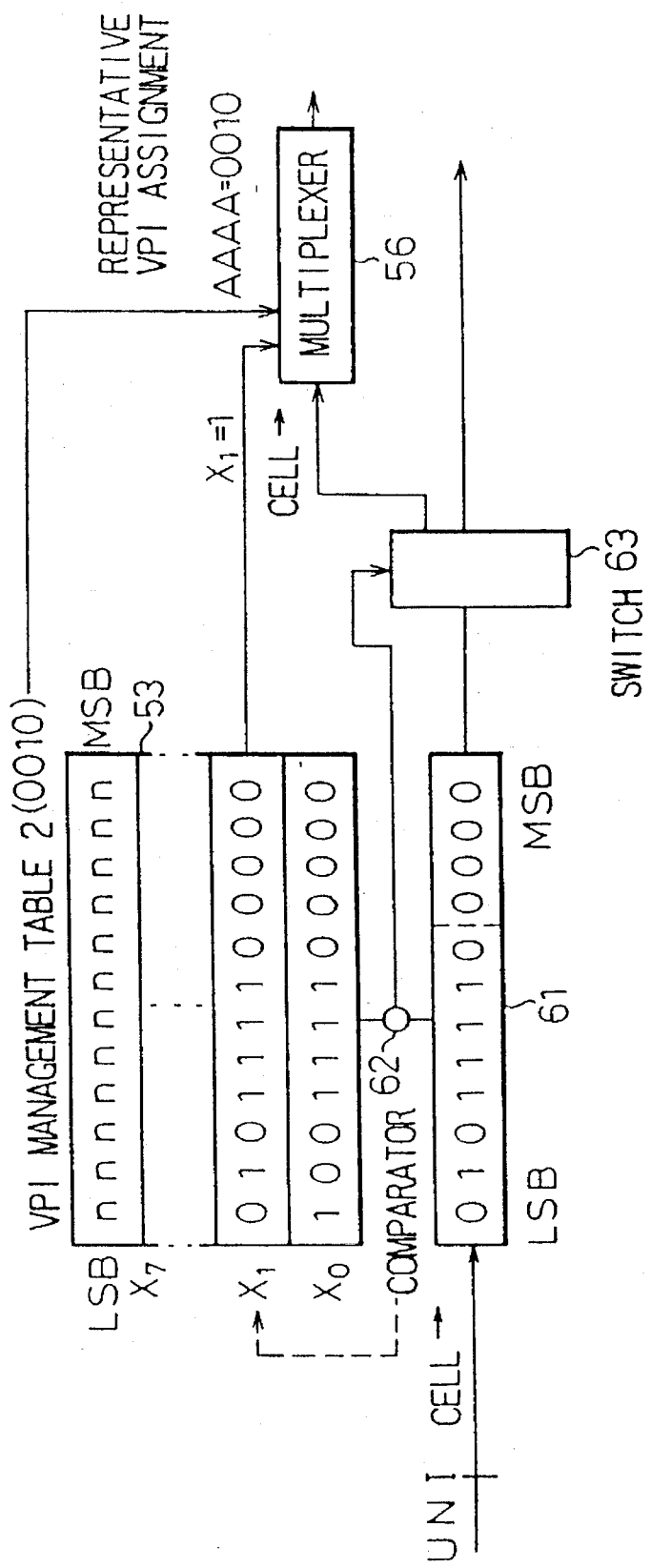
FIG. 12 is a diagram for explaining the operation of the detector at the transmitting side when the representative VPI (2) shown in FIG. 8 is used.

FIG. 12 is a diagram illustrating, as an alternative example, the operation of the detector 55 when the representative VPI (2) shown in FIG. 8 is used.

The process of FIG. 12 is the same as that shown in FIG. 11 up to the step where the VPI #122 is detected. In FIG. 12, the representative VPI and individual VPI information given to the multiplexer 56 are different from those described in FIG. 11. That is, for the representative VPI, a four-bit table number AAAA=0010 stored in the VPI management table 2 is given, and for individual VPI information $X_0$–$X_1$, an identifier $X_1$=1 indicating the use of the VPI #122 is given.

Next, the operation of the multiplexer 56 will be described with reference to FIGS. 13 and 14 and FIGS. 15 and 16. The functional configuration shown in FIG. 13 and the control flow shown in FIG. 14 are related to FIG. 11 and concern the operation of the multiplexer 56 when the representative VPI (1) shown in FIG. 7 is used. On the other hand, the functional configuration shown in FIG. 15 and the control flow shown in FIG. 16 are related to FIG. 12 and concern the operation of the multiplexer 56 when the representative VPI (2) shown in FIG. 8 is used.

The detector 55 shown in the left side of FIG. 13 has already been described with reference to FIG. 11, and therefore, the description thereof will not be repeated here. When a match is detected by the comparator 62, a gate circuit 64 (which corresponds to the VPI assignment functional section 54 of FIG. 10) is enabled for output so that the representative VPI #12 stored at address $X_0$ is written into the ATM header of a multiplex buffer 70. Upon the detection of the match, the ATM cells (VPI #121, VPI #122) to be multiplexed are each directed via the switch 63 to a VPI separator 65 where each cell is disassembled to separate the VPI field from the information field; the separated VPI field and information field are then written into a VPI storing area and an information field storing area, respectively, in the information field of the multiplex buffer 70. For the VPI information written into the VPI storing area, the VPI number of each ATM cell may be written directly, as shown in FIG. 13, or instead, an identifier, i.e. the information identifying an address in the VPI management table, may be written.

A timer 68, which operates with the system clock, starts counting at the instant in time when the first cell is written into the multiplex buffer 70, and outputs a count end signal at the end of a prescribed time. The prescribed time is set equal to the multiplex processing time allowed for cell multiplexing within the previously noted allowable voice delay time. A counter 66 counts up on a cell write clock for every cell write, and outputs a signal when a prescribed number of cells have been multiplexed. A register 67 is used to set the multiplexing delay time for the timer 68 and the number of cells to be multiplexed for the counter 66, thereby controlling the cell multiplexing in the multiplex buffer 70. An OR circuit 69 outputs an output signal from either the timer 68 or the counter 66 as an output enable signal to the multiplex buffer 70. Upon reception of the output enable signal, the multiplex buffer 70 outputs a multiplexed cell assembled up to that time.

Figure 13:
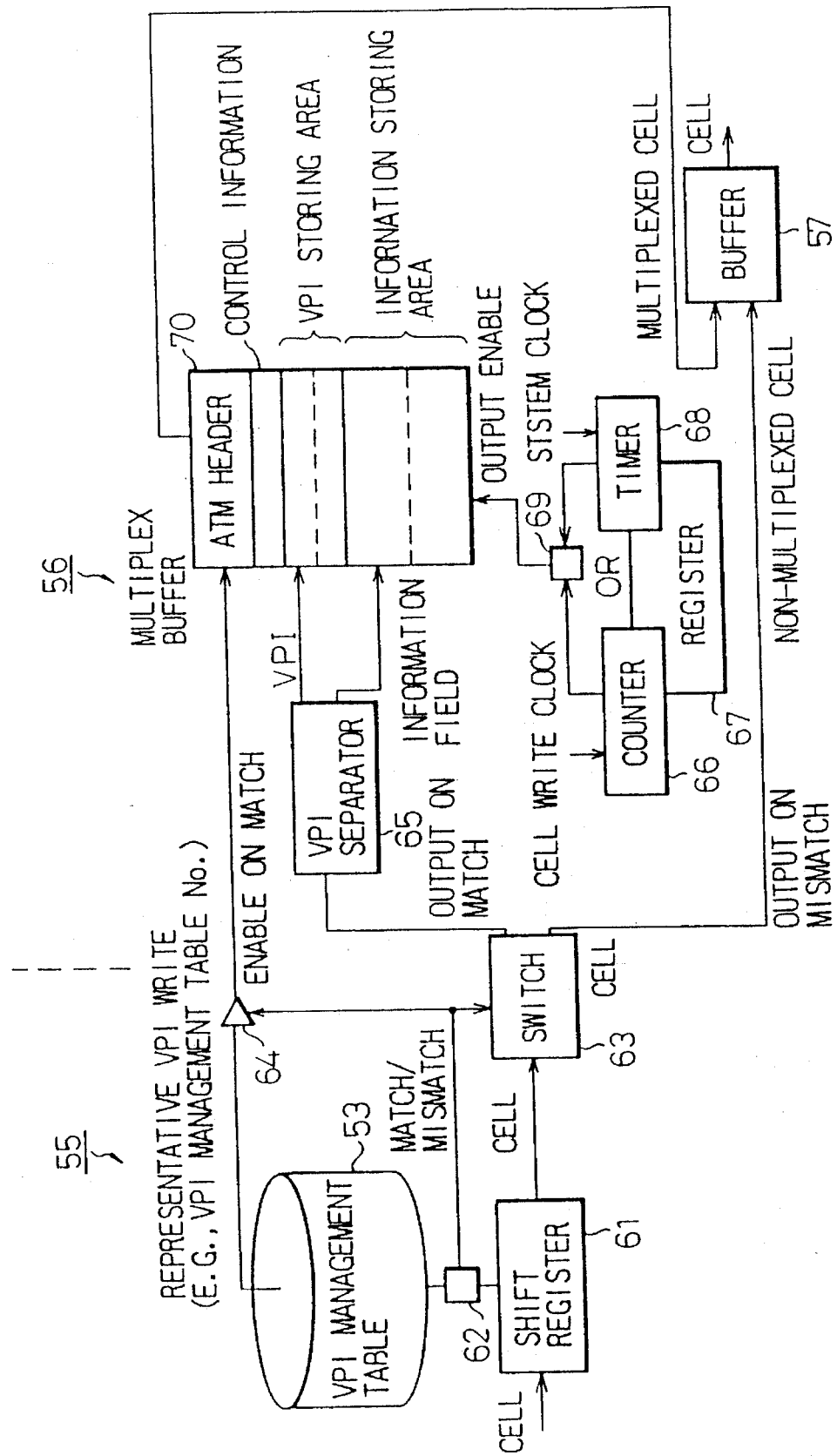
FIG. 13 is a diagram showing an example of the functional configuration of a multiplexer when the representative VPI (1) shown in FIG. 7 is used.
Figure 14:
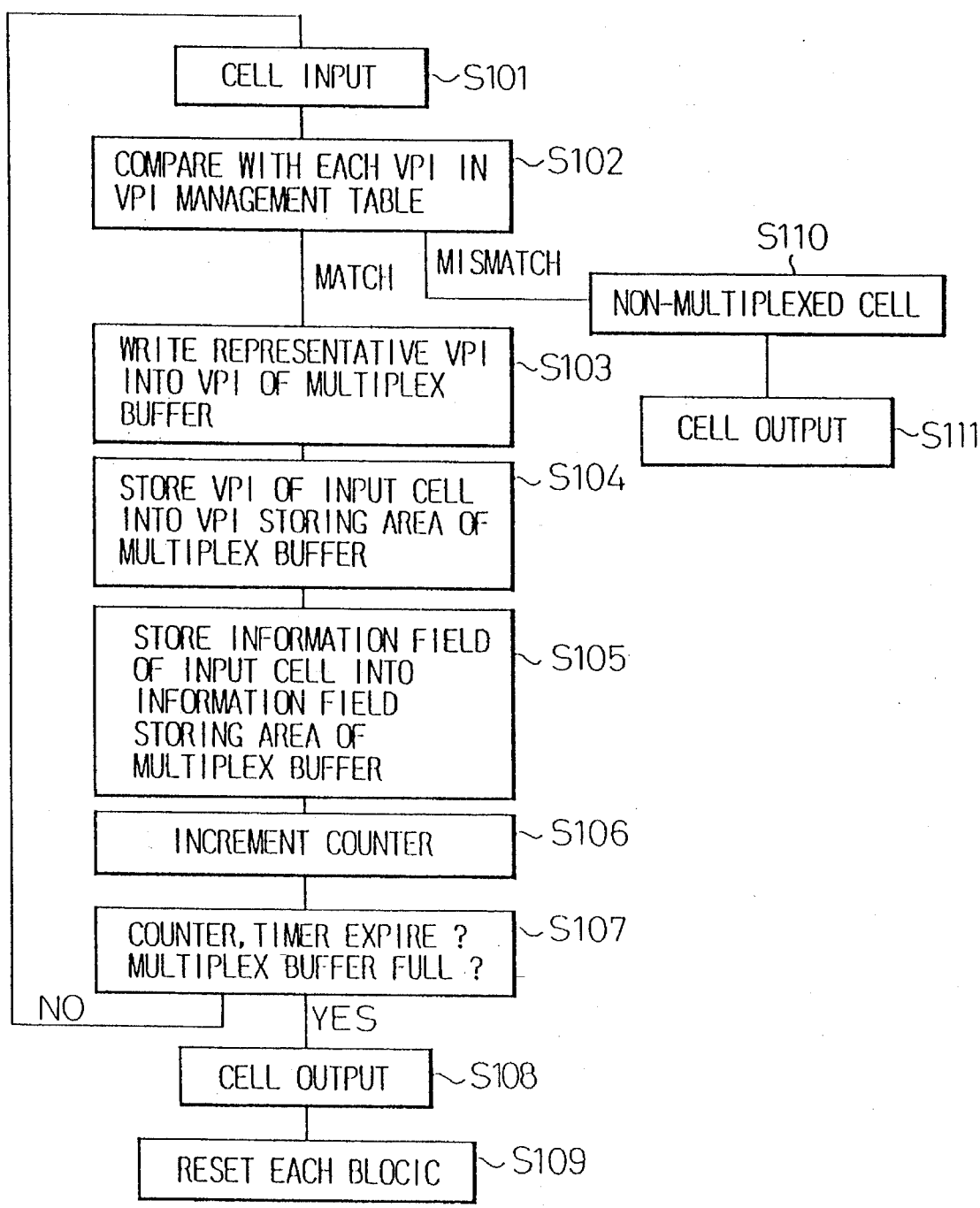
FIG. 14 is a diagram showing an example of a control flow for FIG. 13.

FIG. 14 shows an example of a control flow for FIG. 13.

In FIG. 14, steps S101 and S102 concern the operation of the detector 55, where the VPI of each incoming cell is compared with the VPIs stored in the VPI management table. When a match is found as a result of the comparison, then the process proceeds to step S103 and on to the subsequent steps, which concern the operation of the multiplexer 56. First, the representative VPI is written into the VPI area in the multiplex buffer 70 (S103). Then, the VPI information (VPI number or VPI identifier) and the contents of the information field of the cell are written into the VPI storing area and information field storing area, respectively, in the multiplex buffer 70 (S104, S105). The counter 66 is incremented by the write signal (S106). The timer 68 is already started in step S102 upon the detection of the match.

In step S107, the counter 66, the timer 68, and the multiplex buffer 70 are checked as to whether they have finished counting or become full. If not full (NO), the process returns to step S101 to process the next incoming cell for multiplexing; the number of cells multiplexed thus increases. When the full state is detected in step S107 (YES), the multiplexed cell assembled from the cells multiplexed up to that time is output, thus completing the multiplexing operation (S108, S109). On the other hand, if no match is found in step S102, the multiplexing operation is not performed and the normal ATM cell is output as is (S110, S111).

Now, using the functional configuration of FIG. 15 and the control flow of FIG. 16, the operation of the multiplexer 56 will be described below when the representative VPI (2) shown in FIG. 8 and related to FIG. 12 is used.

Figure 15:
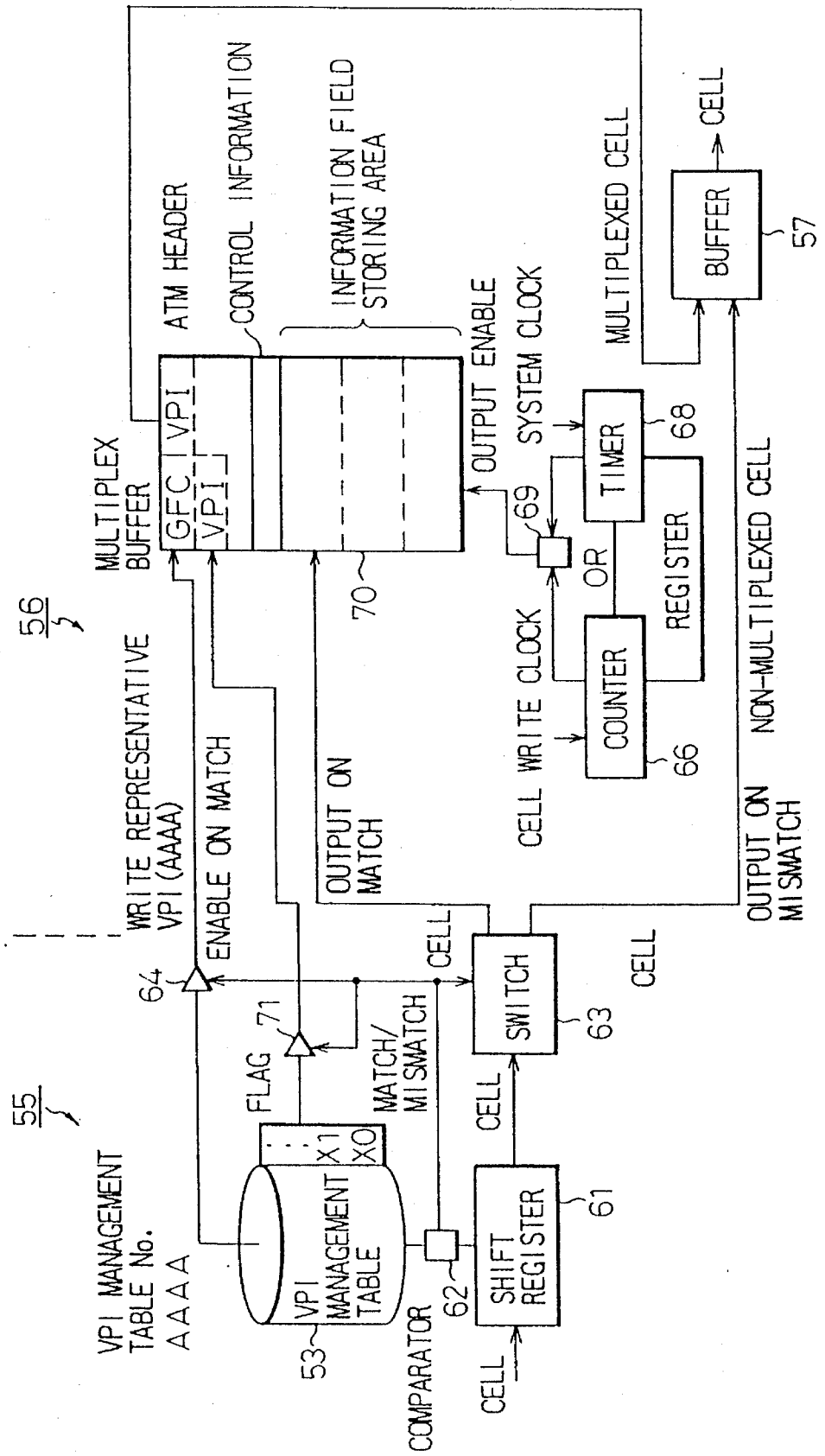
FIG. 15 is a diagram showing an example of the functional configuration of the multiplexer when the representative VPI (2) shown in FIG. 8 is used.
Figure 16:
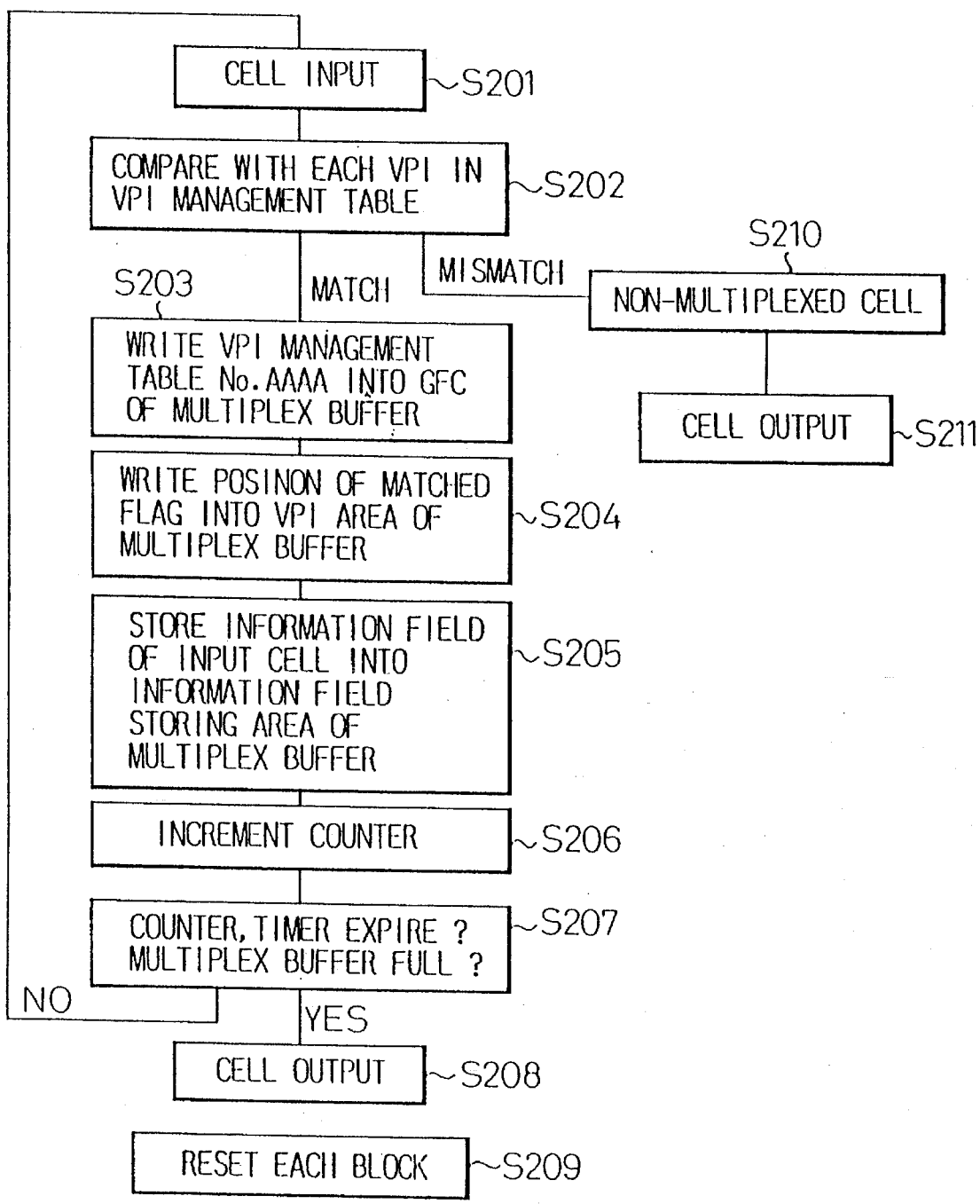
FIG. 16 is a diagram showing an example of a control flow for FIG. 15.

The configuration shown in FIG. 15 is substantially the same as that shown in FIG. 13; in FIG. 15, corresponding parts to those shown in FIG. 13 are designated by the same reference numerals, and the descriptions of such parts are not repeated here. As described with reference to FIG. 8, when the detector 55 detects a match between the representative VPI (high-order four bits) of the incoming cell and the number of the VPI management table 53, the representative VPI (AAAA) corresponding to the VPI management table number is written via the gate circuit 64 into the first four bits (GFC area) in the ATM header of the multiplex buffer 70. When the VPI (high-order four bits) of the incoming cell is not all 0, these four bits may be directly transmitted as the representative VPI.

For individual VPI information, flag information corresponding to the memory address of each individual VPI number written in the VPI management table (1 is set in address $X_0$–$X_1$ where the VPI address is written) is written into the next eight-bit area (VPI area) after the first four bits (GFC area) in the multiplex buffer 70 shown in FIG. 15. In the case of FIG. 15, since the VPI information of each cell to be multiplexed is managed by the VPI management table provided in each transmit/receive node, the VPI separator 65 and the VPI storing area in the multiplex buffer 70 used in the configuration shown in FIG. 13 need not be provided.

FIG. 16 shows a control flow for FIG. 15. The control flow shown in FIG. 16 is substantially the same as that shown in FIG. 14, except that the contents of steps S203 through S205 in FIG. 16 are different from those of steps S103 through S105 in FIG. 14.

In step S203, the VPI management table number (AAAA) is written into the GFC area in the multiplex buffer, as described above, and in step S204, address flags $X_0$–$X_7$ corresponding to matched VPIs are set to 1. Then, in step S205, only the information field of the input cell is written into the information field of the multiplex buffer 70.

Figure 17:
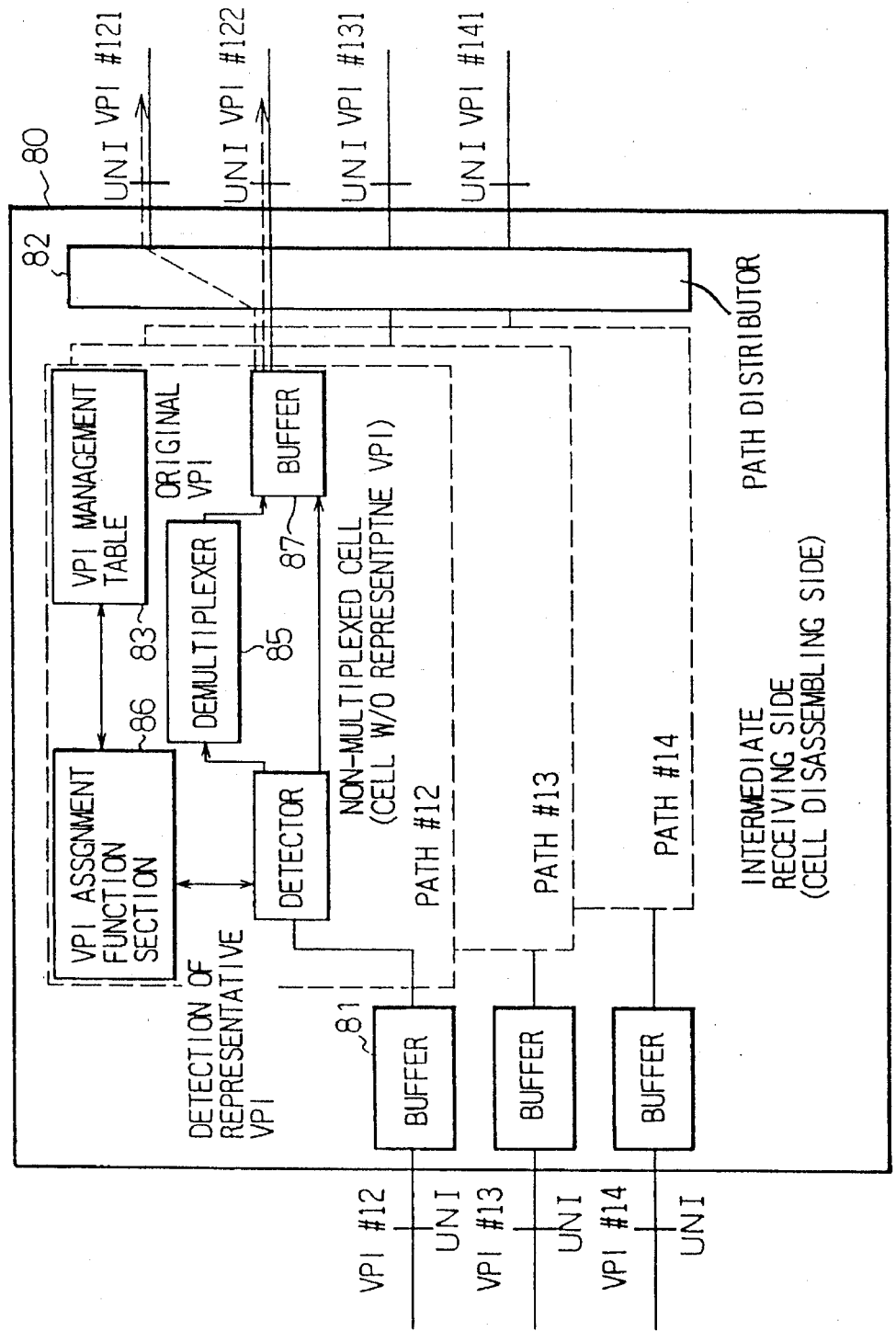
FIG. 17 is a diagram showing an embodiment of the receiving section in the cell multiplexing apparatus according to the present invention.

FIG. 17 is a block diagram showing one embodiment of the receiving section in the cell multiplexing apparatus according to the present invention.

In comparison with the invention shown in FIG. 6, the buffers 81 shown in FIG. 17 correspond to the input buffer means 23 of FIG. 6, and the VPI management table 83 and VPI assignment functional section 86 shown in FIG. 17 correspond to the VPI managing means 22 and representative VPI assigning means 21, respectively, shown in FIG. 6. Further, the path distributor 82 and detector 84 shown in FIG. 17 together correspond to the representative VPI detecting means 24 shown in FIG. 6. The demultiplexer 85 shown in FIG. 17 corresponds to the multiplexed cell disassembling means 25 of FIG. 6, and the buffer 87 shown in FIG. 17 corresponds to the output buffer means 26 of FIG. 6.

In FIG. 17, assuming that the receiving section 80 is used in the ATM exchange (2) shown in FIG. 9, the received cells (respectively having VPI #12, VPI #131, and VPI #231) temporarily held in the buffers 81 are distributed to the respective paths by means of the path distributor 82 controlled by the VPI management table 83, as in the case of the previously-described transmitting section (FIG. 10). The detector 84 detects the representative VPI carried in the ATM header of each received cell to distinguish the multiplexed cell (VPI #12) transmitted from the transmitting section. Each cell having the representative VPI #12 is reconstructed into the original individual ATM cells (VPI #121, VPI #122) by the demultiplexer 85 at the next stage. The reconstructed ATM cells and the non-multiplexed normal cells are buffered in the buffer 87 which outputs each cell onto the path designated by the VPI of the cell at the prescribed cell transmit timing.

Figure 18:
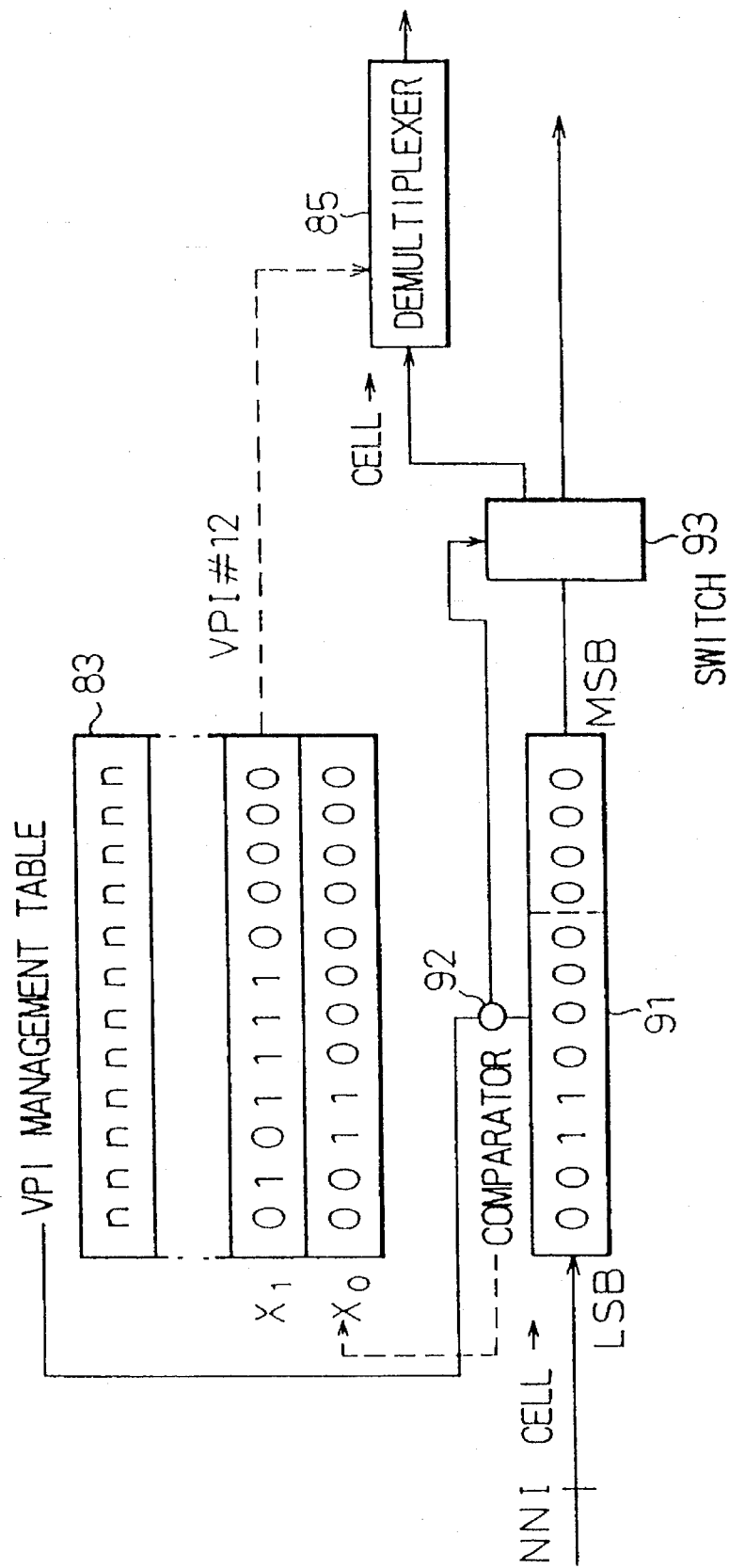
FIG. 18 is a diagram for explaining the operation of a detector at the receiving side when the representative VPI (1) shown in FIG. 7 is used.

FIG. 18 is a diagram illustrating the operation of the detector 84 when the representative VPI (1) shown in FIG. 7 is used.

In FIG. 18, the VPI area in the ATM header of each received cell is input to a shift register 91 in the detector 84. A comparator 92 in the detector 84 compares the VPI held in the shift register 91 with the representative VPI supplied from the VPI management table 83; when they match, the cell is determined as a multiplexed cell and a switch 93 at the subsequent stage is set to connect to the demultiplexer 85. In the example shown, the representative VPI #12 is input to the shift register 91, and a match is found with the representative VPI #12 stored at address $X_0$ in the VPI management table 83.

When the representative VPI format (1) shown in FIG. 7 is used, the VPI information of each individual cell is either directly written in the information field of the multiplexed cell or identified by an address identifier contained in the VPI management table 83, as previously described. In the former case, individual ATM cells can be reconstructed directly from the received cell by the demultiplexer 85, and in the latter case, the VPI #122 contained in the VPI management table 83 can be obtained using the address identifier $X_1$, as shown by a dotted line in FIG. 18.

Figure 19:
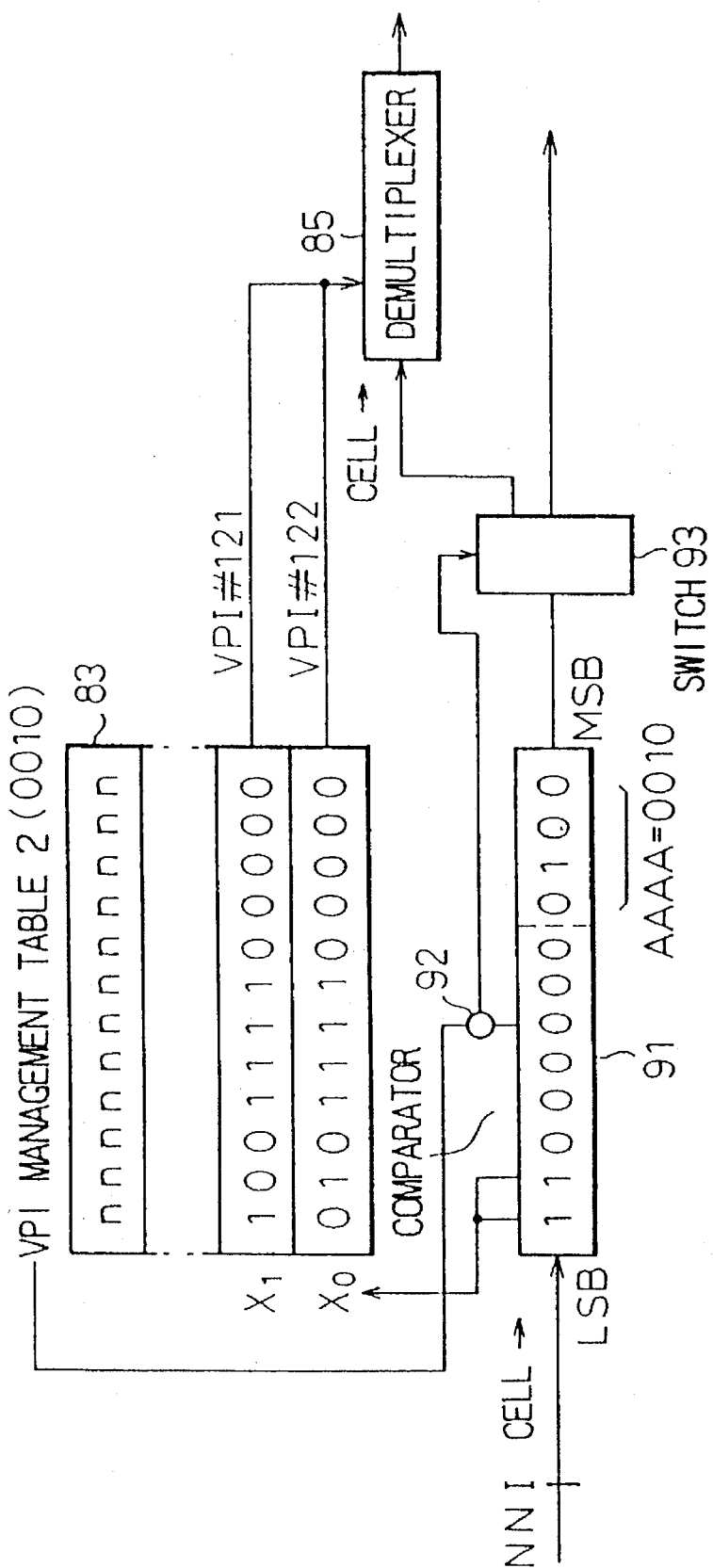
FIG. 19 is a diagram for explaining the operation of the detector at the receiving side when the representative VPI (2) shown in FIG. 8 is used.

FIG. 19 is a diagram illustrating, as an alternative example, the operation of the detector 84 when the representative VPI format (2) is used.

In FIG. 19, the GFC area consisting of the first four bits input to the shift register 91 is examined to determine whether the cell is a multiplexed cell or not (cells other than AAAA=0000 are multiplexed cells). The representative VPI number indicated by the first four bits refers to the corresponding VPI management table number (1–15), and the value of each remaining VPI bit ($X_0$–$X_1$) indicates the corresponding memory address in the table. Therefore, each individual VPI information can be readily obtained using these bits. In the example shown, the VPI management table number 2 is obtained from the representative VPI #2 of the received cell, and since the remaining received VPI bits are $X_0$–$X_7$=11000000, the individual VPI information designated by the representative VPI is obtained from address $X_0$ and address $X_1$ in the VPI management table number 2 (VPI #121 and VPI #122).

Next, the operation of the demultiplexer 85 will be described with reference to FIGS. 20 and 21 and FIGS. 22 and 23. The functional configuration shown in FIG. 20 and the control flow in FIG. 21 are related to FIG. 18 and concern the operation of the demultiplexer 85 when the representative VPI (1) shown in FIG. 7 is used. The functional configuration shown in FIG. 22 and the control flow in FIG. 23 are related to FIG. 19 and concern the operation of the demultiplexer 85 when the representative VPI (2) shown in FIG. 8 is used.

The detector 84 shown in the left side of FIG. 20 has already been described with reference to FIG. 18, and therefore, the description thereof will not be repeated here. When a match is detected by the comparator 92 with the representative VPI #12, the multiplexed cell for which the match was detected is written into a multiplex buffer 94 in the demultiplexer 85 via a switch 93. When the multiplexed cell is written into the multiplex buffer 94, a read/write circuit 95 reads out data of the multiplexed VPI storing areas and information field storing areas from the information field, and sequentially writes the data into the cell buffers, 96, 97, . . . , each constructed with a shift register. For example, VPI #121 and VPI #122 read from the VPI storing areas are written into the ATM headers of the cell buffers 96 and 97, respectively, and their corresponding cell information read from the information field storing areas is written into the information fields of the respective buffers. Each ATM cell thus reconstructed is sequentially clocked out of the shift register and fed to a buffer 87 at the output stage.

The above blocks are reset after the cells are output from the cell buffers 96, 97, . . . If a pointer facility is provided to the cell buffers, the above blocks can be reset at the instant in time when the data are written into the cell buffers. A pointer facility is used to indicate the shift position in a shift register, i.e., data position within a shift register. By using this, read/write operations can be started at the address location next to the pointer; therefore, there is no need to wait until the data are output from the cell buffers. This has the effect of reducing delays, etc.

Figure 20:
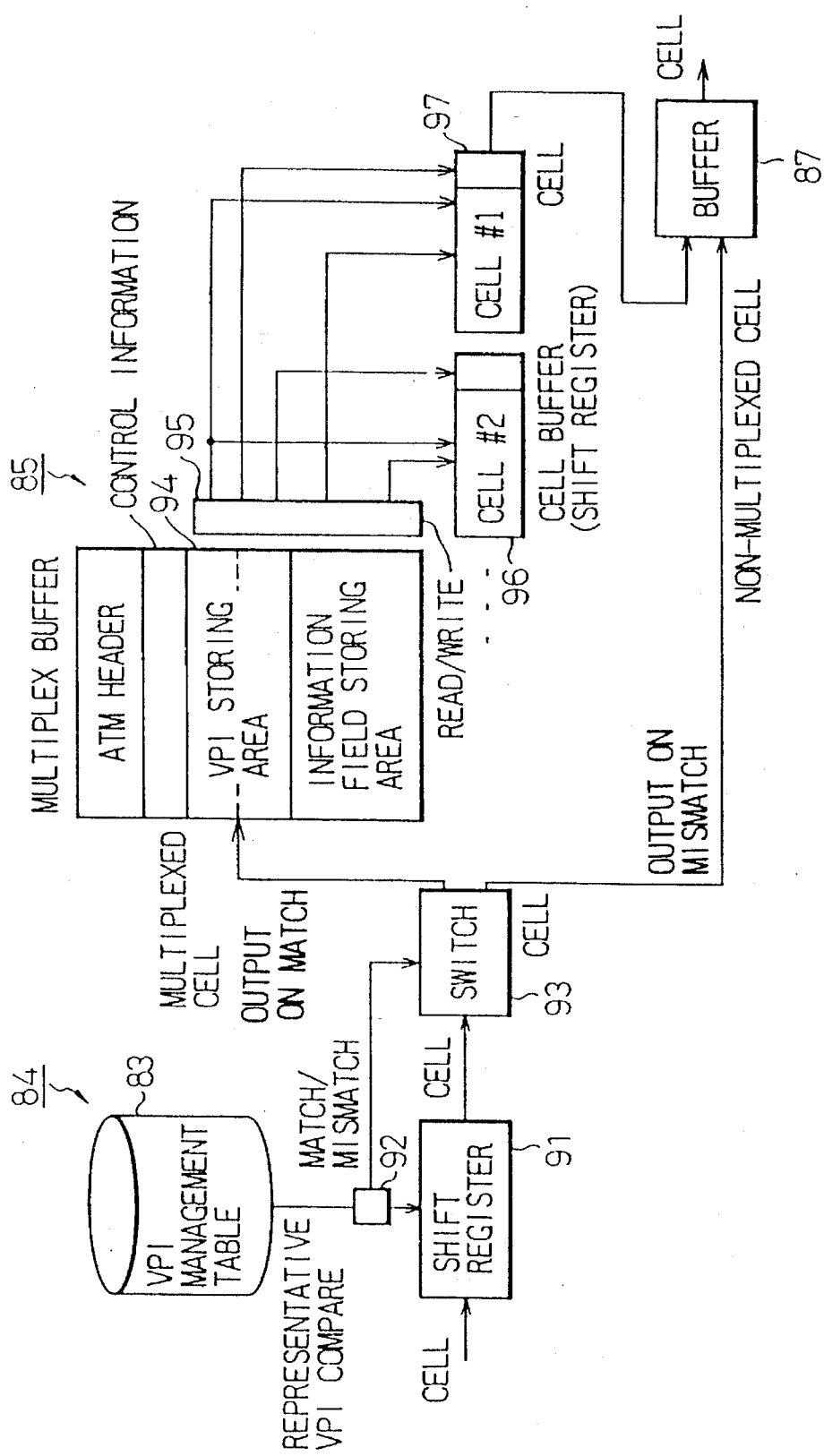
FIG. 20 is a diagram showing an example of the functional configuration of a demultiplexer when the representative VPI (1) shown in FIG. 7 is used.
Figure 21:
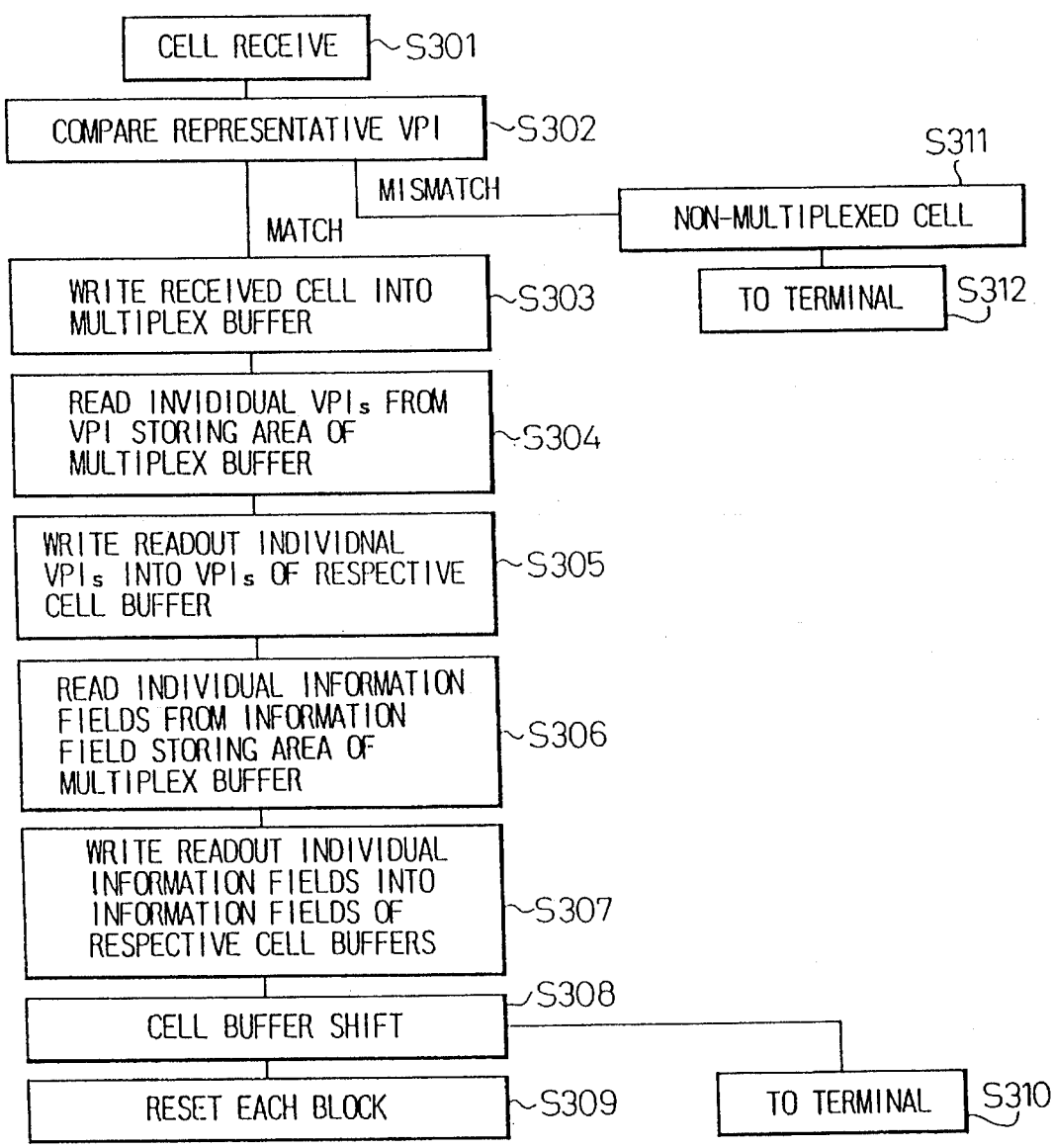
FIG. 21 is a diagram showing an example of a control flow for FIG. 20.

FIG. 21 shows an example of a control flow for FIG. 20 described above.

In FIG. 21, steps S301 and S302 concern the operation of the detector 84, where the VPI of each received cell is compared with the VPIs contained in the VPI management table. When a match is found, the process proceeds to step S303 and on to the subsequent steps, which concern the operation of the demultiplexer 85. First, the received cell is written into the multiplex buffer 94 (S303). Next, the individual ATM cell information read out of the VPI storing area and information field storing area of the multiplex buffer is written into the ATM header and information field in the respective cell buffers 96, 97, . . . (S304–S307). Each individual ATM cell reconstructed by the above steps is sequentially clocked out for transmission to the terminal designated by the VPI of the cell. When the transmission is completed, each block is reset to complete the receive process (S308–S310). Non-multiplexed cells are sent out to the designated terminals without undergoing the above process (S311, S312).

Next, using the functional configuration of FIG. 22 and the control flow of FIG. 23, the operation of the demultiplexer 85 will be described below when the representative VPI (2) shown in FIG. 8 and related to FIG. 19 is used.

Figure 22:
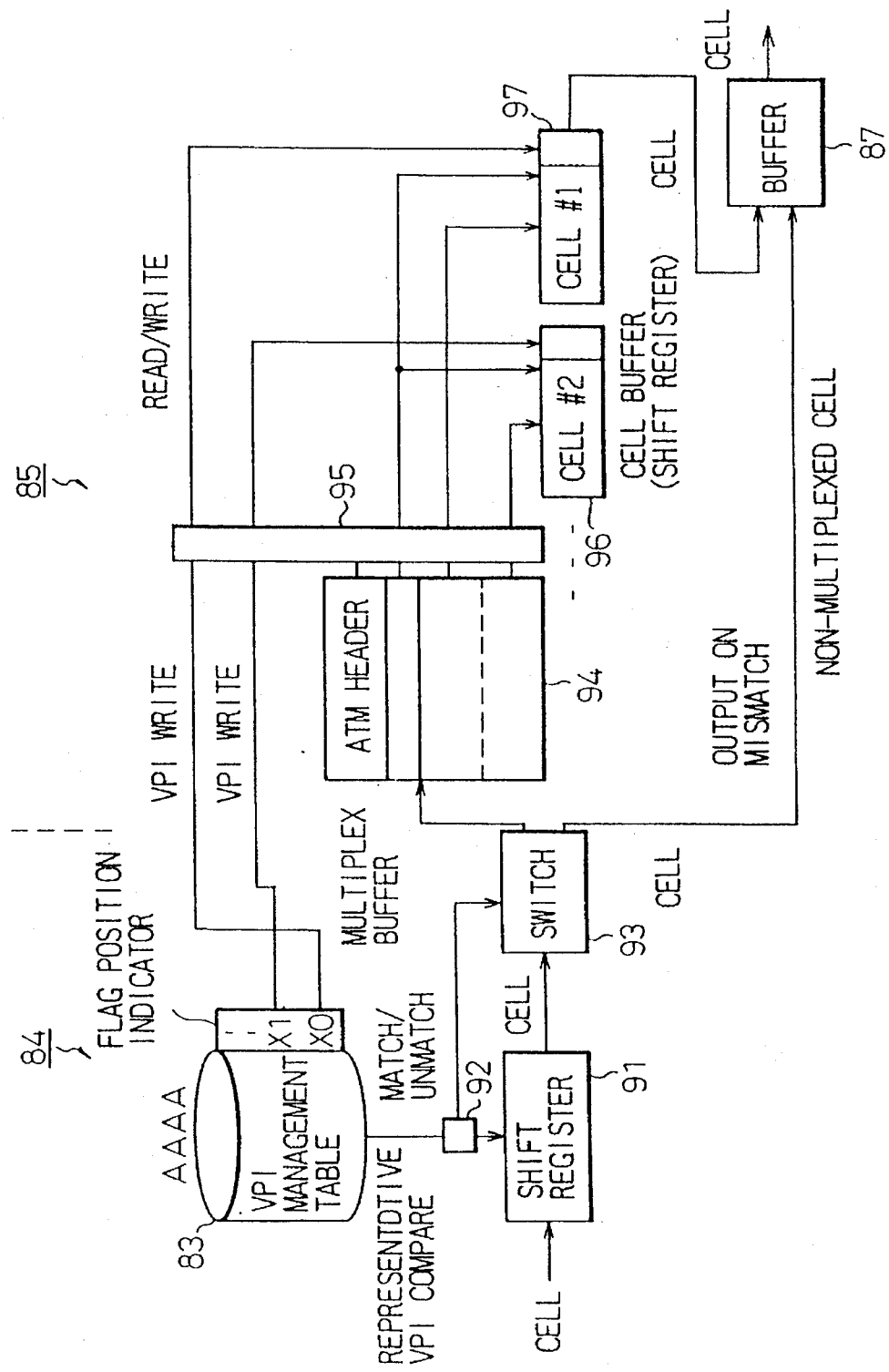
FIG. 22 is a diagram showing an example of the functional configuration of the demultiplexer when the representative VPI (2) shown in FIG. 8 is used.
Figure 23:
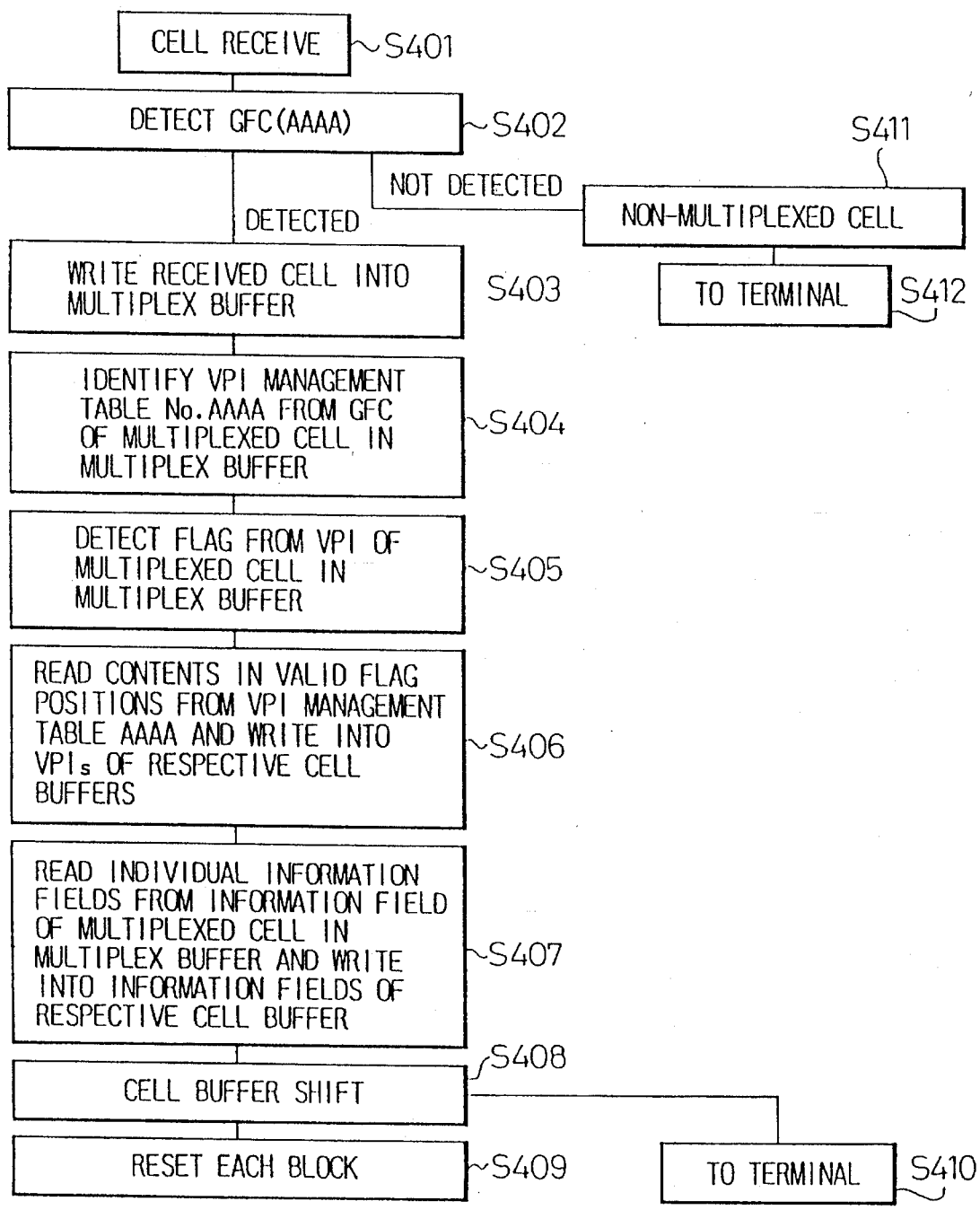
FIG. 23 is a diagram showing an example of a control flow for FIG. 22.

The configuration shown in FIG. 22 is substantially the same as that shown in FIG. 20; in FIG. 22, corresponding parts to those shown in FIG. 20 are designated by the same reference numerals, and therefore, descriptions of such parts are not repeated here. As described with reference to FIG. 19, each multiplexed cell is detected by the detector 84, and the individual VPI numbers (VPI #121, VPI #122) of the component cells are obtained from the corresponding VPI management table 83.

The difference from the configuration of FIG. 20 is that in FIG. 22, the VPI numbers obtained from the VPI management table 83 are written into the ATM cell areas in the respective cell buffers via the read/write circuit 95.

In the configuration of FIG. 20 also, in cases in which VPI identifiers indicating addresses within the VPI management table are written in the information field storing area, the VPI numbers obtained from the VPI management table are written into the ATM cell areas of the respective cell buffers via the read/write circuit 95, as in the above configuration.

FIG. 23 shows an example of a control flow for FIG. 22.

In FIG. 23, the GFC area (AAAA) is checked in step S402 to detect a representative VPI. If AAAA are not all 0s, then the cell is determined as a multiplexed cell, and the received cell is written into the multiplex buffer 94 (S403). Next, from the addresses within the VPI management table corresponding to the AAAA, the VPI numbers stored at the addresses designated by the address flags $X_0$–$X_7$ whose value is set to "1" are extracted and written into the cell buffers as VPIs (S404–S406). Next, the information fields of the individual cells are read out of the information field storing area in the multiplex buffer and written into the respectively corresponding cell buffers (S407). The ATM cells are thus reconstructed. After that, each cell is sequentially clocked out for transmission to the terminal designated by the VPI of the cell (S408, S410).

Figure 24:
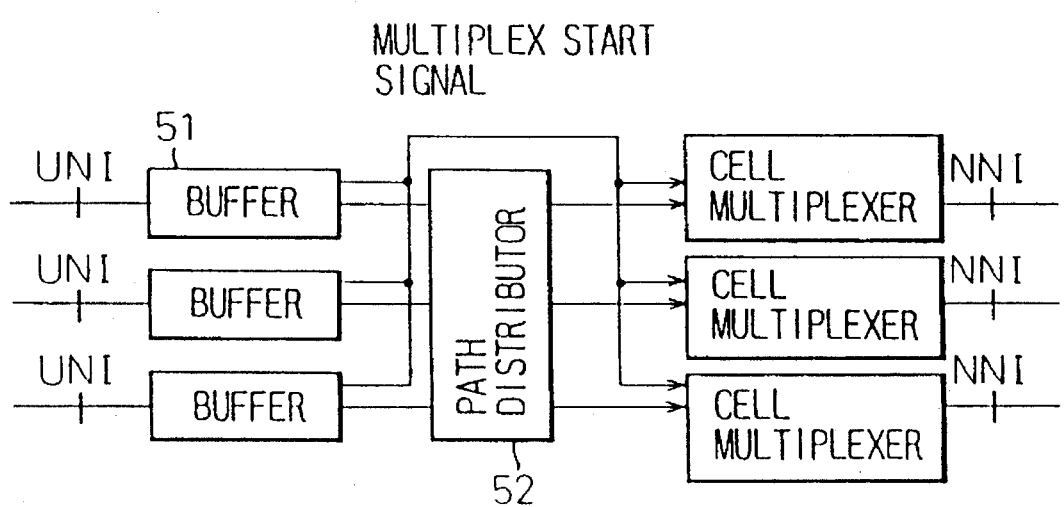
FIG. 24 is a diagram showing an embodiment in which each input buffer in the transmitting section is provided with a congestion prediction function.

FIG. 24 hereinafter described concerns an embodiment in which the input buffers 51 in the transmitting section shown in FIG. 10 are provided with a congestion prediction function.

In FIG. 24, each input buffer 51 at the transmitting side is constructed, for example, from a first-in, first-out (FIFO) buffer memory or from a RAM, and is so configured as to output a congestion prediction signal when the number of received cells being buffered exceeds a prescribed number. For example, if the buffer has the capacity for 100 cells, the congestion prediction signal is issued when the number of buffered cells reaches 80. Upon reception of this signal, the multiplexer 56 (FIG. 10) starts cell multiplexing to reduce the number of cells and thereby prevent the occurrence of path congestion. The cell multiplexing is stopped upon the removal of the above signal. Such control is performed to prevent cell transmission delays when no congestion is expected.

In the above example, cell multiplex control to prevent congestion is performed within the cell multiplexing apparatus itself, but such control may be performed between communication nodes. Taking the network shown in FIG. 9 as an example, when a congestion prediction signal is issued in the ATM exchange (3) 46 by way of a common line signal, a control cell, etc., the ATM exchange (3) 46 alerts the ATM exchange (2) 43 accordingly. The alerted ATM exchange (2) 43 then starts multiplexing the cells to be transmitted onto the designated path. In like manner, the ATM exchange (2) 43 alerts the ATM exchange (1) 42 which then starts cell multiplexing in the same manner as above. As a result, the number of cells to be transmitted to the ATM exchange (3) 46 is reduced, and the occurrence of path congestion is thus prevented.

Figure 25:
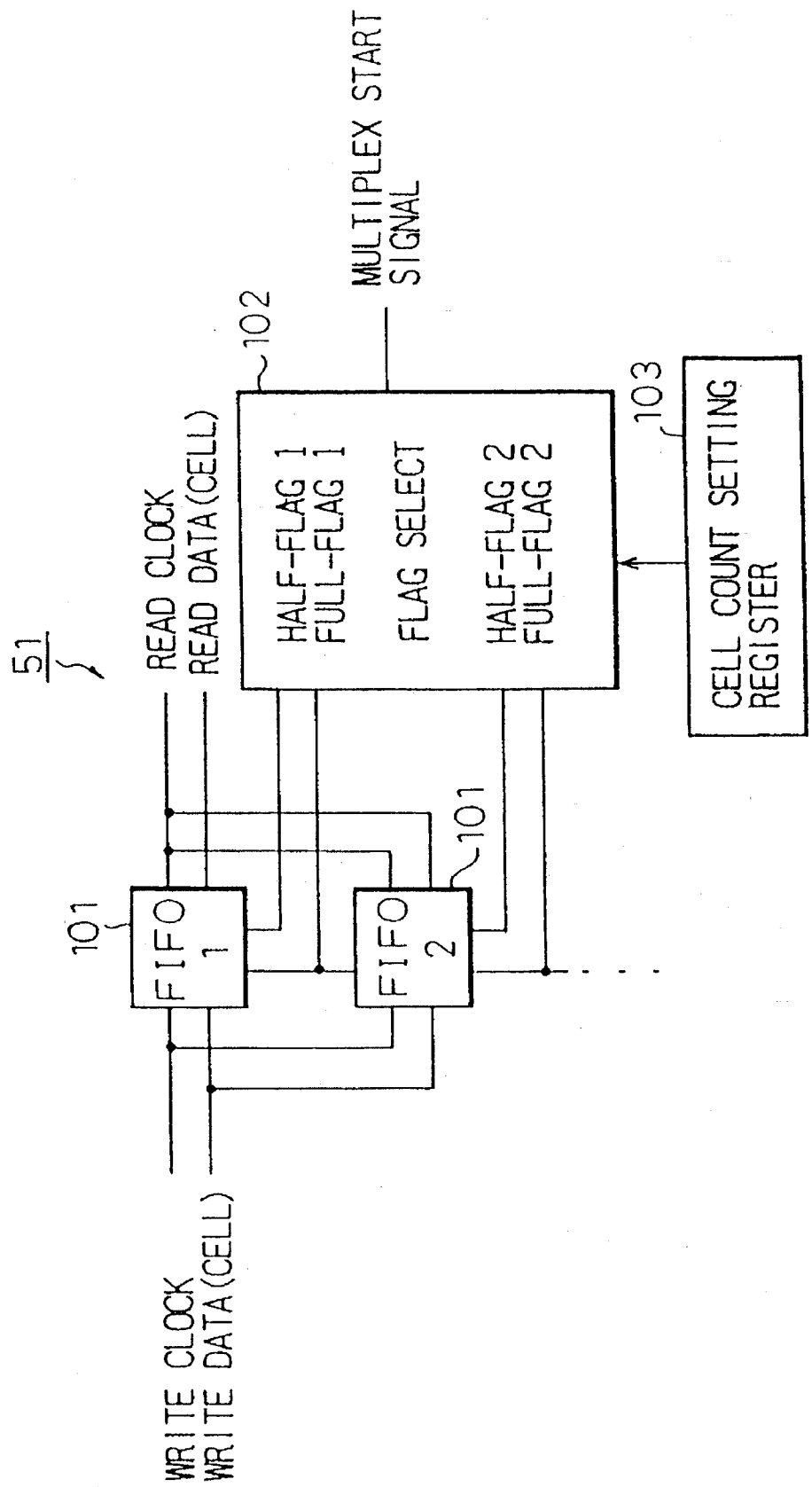
FIG. 25 is a diagram showing an example in which each buffer shown in FIG. 24 is constructed from a FIFO memory.

FIG. 25 shows an example in which each input buffer in the transmitting section is a FIFO buffer memory.

In FIG. 25, if each FIFO buffer 101 has a depth for ten cells, the following FIFO flag outputs are supplied to a selector 102 at the next stage; that is, a half-flag 1 is set when the number of input cells reaches five, and a full-flag 1 is set when the number reaches 10, and likewise, a half-flag 2 and a full-flag 2 are set when the number of input cells reaches 15 and 20, respectively. Any one of these flag outputs can be selected by setting an appropriate value in a cell count setting register 103. By using the selected flag output as the congestion prediction signal, i.e., the multiplex start signal, cell multiplex control can be performed to match various congestion conditions.

Figure 26:
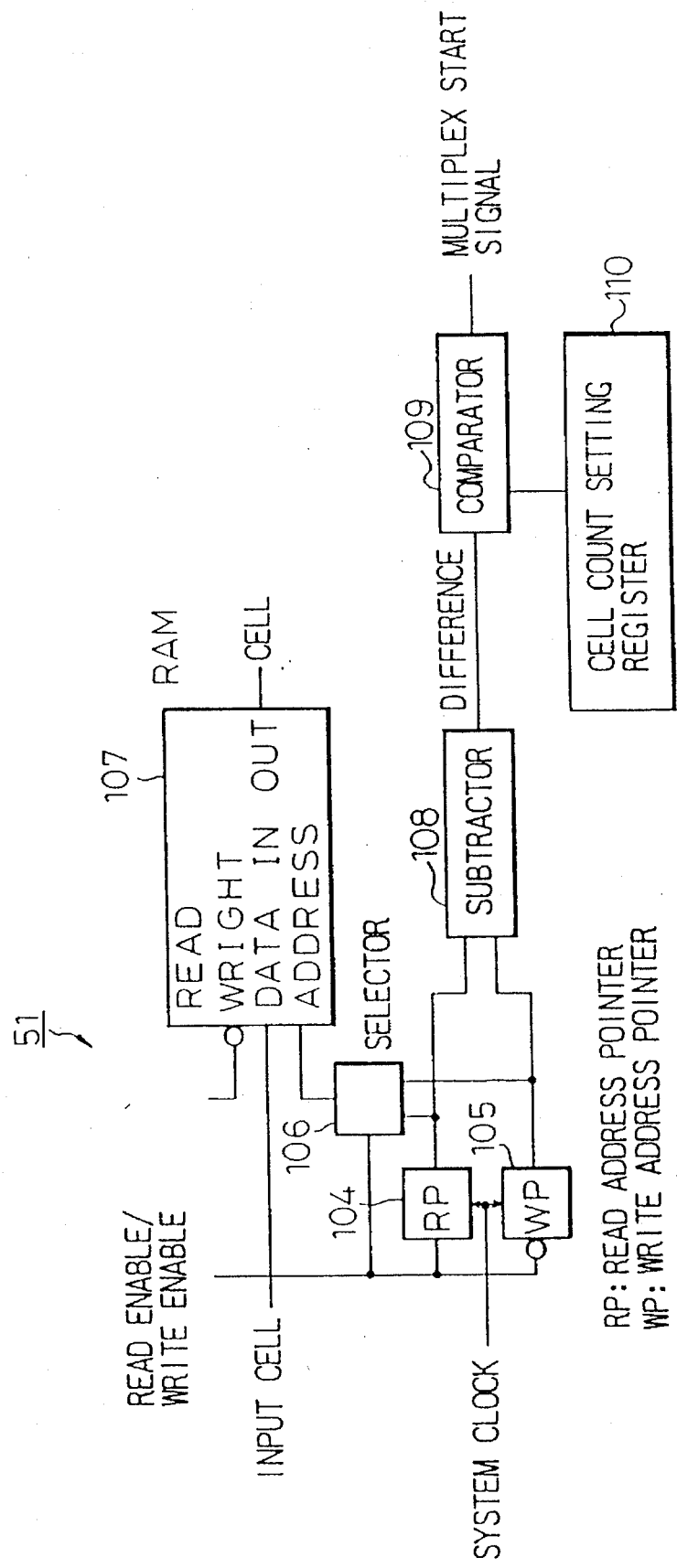
FIG. 26 is a diagram showing an example in which each buffer shown in FIG. 24 is constructed from a RAM.

FIG. 26 shows an example in which each input buffer in the transmitting section is constructed from a RAM.

In FIG. 26, a read address pointer (RP) 104 and a write address pointer (WP)105 respectively indicate RAM read/write (input/output) addresses, either one of which is selected by an address select circuit 106 for input to a RAM 107. Read enable/write enable signals control the selection of one or other of the pointers, 104 or 105, and switches the address select circuit 106 accordingly. The pointers 104 and 105 are each constructed from a ring counter which circulates in a cyclic manner, completing one cycle with a prescribed number of system clock pulses. A subtractor 108 obtains the difference between the addresses fed from the read address pointer 104 and the write address pointer 105. The difference obtained by the subtractor 108 is supplied to a comparator 109 at the next stage, where the difference is compared with the set value of the cell count setting register 110. The multiplex start signal is output when the difference between the read (output) address and the write (input) address exceeds the set value.

For example, when the read address pointer indicates 035 hex and the write address pointer indicates 048B hex, then the difference is 459 hex. Since one cell consists of 53 octets, which is 35 hex in hexadecimal notation, the difference 459 hex is equivalent to 15 cells. This difference is compared with the value set in the cell count setting register 110. While this configuration makes the circuit more complex compared with that constructed with the FIFO buffers first described, the advantage is that the cell count that evokes the multiplex start signal can be set at a desired value.

As described, according to the present invention, cells having different VPIs can be multiplexed if they are intended for transmission along the same path. This serves to enhance cell utilization, and also, the resulting reduction in the number of cells is effective in preventing path congestion.

Furthermore, since the invention is targeted at the cells intended for transmission along the same path, cell multiplexing is performed only in the ATM exchange at the UNI side, and processing such as multiplexing and demultiplexing need not be performed in intermediate ATM exchanges. This serves to eliminate cell transmission delays associated with such processing, and realizes cell multiplexing that ensures almost real-time transmission.

I claim:

1. A cell multiplexing apparatus in an ATM network, comprising: transmitting means in which information fields of a plurality of ATM cells with different path identifiers intended for transmission along the same path are multiplexed and stored into an information field of one multiplexed cell, and a representative path identifier globally, representing the path identifiers of said plurality of ATM cells intended for transmission along said same path, is assigned as the path identifier of said multiplexed cell for transmission; and receiving means in which said representative path identifier is detected from received cells and said plurality of ATM cells having individual path identifiers and transmitted along said same path are reconstructed from said multiplexed cell having said representative path identifier.

2. A cell multiplexing apparatus in an ATM network according to claim 1, wherein said multiplexed cell carries said representative path identifier in an ATM header thereof, and individual path identifier information, designated by said representative path identifier, of said plurality of ATM cells intended for transmission along said same path in an information field thereof.

3. A cell multiplexing apparatus in an ATM network according to claim 1, wherein a path identifier area in an ATM header of said multiplexed cell is divided into two segments so that said representative path identifier designating the path for said multiplexed cell is carried in one segment and path identifier information of said plurality of ATM cells intended for transmission along said same path is carried in the other segment.

4. A cell multiplexing apparatus in an ATM network according to claim 3, wherein said representative path identifier is assigned to a GFC area of an ATM cell format of a user network interface, UNI, at a node-to-network interface, NNI, and the path identifier information of said plurality of ATM cells intended for transmission along said same path is assigned to representative bits in the remaining path identifier area as identifiers that individually indicate the use of a plurality of path identifiers on said same path.

5. A cell multiplexing apparatus in an ATM network according to claim 1, wherein said representative path identifier is given as an initial value permanently assigned to each individual communication node, or as a variable value that is determined in accordance with a prescribed communication protocol prior to communication with the destination node.

6. A cell multiplexing apparatus in an ATM network according to claim 2, wherein said representative path identifier is given as an initial value permanently assigned to each individual communication node, or as a variable value that is determined in accordance with a prescribed communication protocol prior to communication with the destination node.

7. A cell multiplexing apparatus in an ATM network according to claim 3, wherein said representative path identifier is given as an initial value permanently assigned to each individual communication node, or as a variable value that is determined in accordance with a prescribed communication protocol prior to communication with the destination node.

8. A cell multiplexing apparatus in an ATM network according to claim 4, wherein said representative path identifier is given as an initial value permanently assigned to each individual communication node, or as a variable value that is determined in accordance with a prescribed communication protocol prior to communication with the destination node.

9. A cell multiplexing apparatus in an ATM network according to claim 1, wherein said transmitting means includes congestion predicting means for predicting the occurrence of congestion from the relationship between the number of input cells and the number of output cells, said multiplexed cell being assembled and transmitted only when the occurrence of congestion is predicted.

10. A cell multiplexing apparatus in an ATM network, comprising transmitting means which includes: input buffer means for buffering a prescribed number of input cells; path identifier managing means for managing path identifiers of a plurality of ATM cells with different path identifiers to be transmitted along the same path; representative path identifier assigning means for assigning one representative path identifier representing the path identifiers of said plurality of ATM cells to be transmitted along said same path; path match detecting means for comparing the path identifier of each of said input cells supplied from said input buffer means with path identifiers supplied from said managing means as designating the same path, and thereby separating said input cells into matched cells and unmatched cells for output; multiplexed cell assembling means for assembling said matched input cells supplied from said path match detecting means into one multiplexed cell and for assigning said representative path identifier supplied from said representative path identifier assigning means as the path identifier of said multiplexed cell; and output buffer means for buffering said multiplexed cell from said multiplexed cell assembling means and/or said unmatched input cells from said path match detecting means for output; and receiving means which includes: input buffer means for buffering a prescribed number of received cells; representative path identifier assigning means for assigning a representative path identifier for a multiplexed cell assembled from a plurality of ATM cells with different path identifiers to be transmitted along the same path; path identifier managing means for managing path identifiers of said plurality of ATM cells that form said multiplexed cell; representative path identifier detecting means for comparing the path identifier of each of said received cells supplied from said input buffer means with said representative path identifier supplied from said representative path identifier assigning means, and thereby separating said received cells into multiplexed cells having a matched representative path identifier and other received cells for output; multiplexed cell disassembling means for disassembling each of said matched multiplexed cells supplied from said representative path identifier detecting means into said plurality of ATM cells forming said multiplexed cell; and output buffer means for buffering said plurality of ATM cells from said multiplexed cell disassembling means and/or said unmatched received cells from said representative path identifier detecting means for output.

11. A cell multiplexing apparatus in an ATM network according to claim 10, wherein in said path identifier managing means, said representative path identifier, which is given as an initial value permanently assigned to each individual communication node or as a set value variably determined in accordance with a prescribed communication protocol prior to communication with the destination node, and said plurality of path identifiers designated by said representative path identifier are contained in accordance with a prescribed format.

12. A cell multiplexing apparatus in an ATM network comprising transmitting means which includes: input buffer means for buffering a prescribed number of input cells; path identifier managing means for managing path identifiers of a plurality of ATM is to be transmitted along the same path; representative path identifier assigning means for assigning one representative path identifier representing the path identifiers of said plurality of ATM cells to be transmitted along said same path; path match detecting means for comparing the path identifier of each of said input cells supplied from said input buffer means with path identifiers supplied from Said managing means as designating the same path, and thereby separating said input cells into matched cells and unmatched cells for output; multiplexed cell assembling means for assembling said matched input cells supplied from said path match detecting means into one multiplexed cell and for assigning said representative path identifier supplied from said representative path identifier assigning means as the path identifier of said multiplexed cell; and output buffer means for buffering said multiplexed cell from said multiplexed cell assembling means and/or said unmatched input cells from said path match detecting means for output; and receiving means which includes: input buffer means for buffering a prescribed number of received cells; representative path identifier assigning means for assigning a representative path identifier for a multiplexed cell assembled from a plurality of ATM cells to be transmitted along the same path; path identifier managing means for managing path identifiers of said plurality of ATM cells that form said multiplexed cell; representative path identifier detecting means for comparing the path identifier of each of said received cells supplied from said input buffer means with said representative path identifier supplied from said representative path identifier assigning means, and thereby separating said received cells into multiplexed cells having a matched representative path identifier and other received cells for output; multiplexed cell disassembling means for dissasembling each of said matched multiplexed cells supplied from said representative path identifier detecting means into said plurality of ATM cells forming said multiplexed cell; and output buffer means for buffering said plurality of ATM cells from said multiplexed cell disassembling means and/or said unmatched received cells from said representative path identifier detecting means for output, in said path identifier managing means, said representative path identifier, which is given as an initial value permanently assigned to each individual communication node or as a set value variably determined in accordance with a prescribed communication protocol prior to communication with the destination node, and said plurality of path identifiers designated by said representive path identifier, are contained in accordance with a prescribed format, and wherein said prescribed format is comprised of: said representative path identifier set at a prescribed address; and said plurality of path identifiers for said same path, set at addresses within a prescribed range before or after said representative path identifier.

13. A cell multiplexing apparatus in an ATM network according to claim 11, wherein said prescribed format is comprised of: a memory area designated by said representative path identifier assigned to a GFC area of an ATM cell format of a user network interface, UNI, at a node-to-network interface, NNI; and said plurality of path identifier for said same path, set at memory addresses within a memory area designated by the path identifiers that are assigned to respective bits in other path identifiers areas than said GFC area as identifiers that individually indicate the use of said plurality of path identifiers on said same path.

14. A cell multiplexing apparatus in an ATM network according to claim 10, wherein said input buffer means of said transmitting means issues a congestion prediction signal when the number of input cells being buffered has reached a prescribed number, and said path identifier managing means controls said path match detecting means so that multiplexed cell assembly is started when said congestion prediction signal is issued, and is stopped when said congestion prediction signal is removed.

15. A multiplexing apparatus for multiplexing fixed length packets transmitted in a communication network, the apparatus comprising:

information multiplexing means for multiplexing information fields of a plurality of fixed-length packets with different path identifiers transmitted along the same path, so that an information field of a fixed-length packet includes the information fields of a plurality of fixed-length packets;

identifier producing means for assigning a second identifier that represents in common first identifiers assigned to said plurality of fixed length packets transmitted along the same path direction; and fixed length packet producing means for producing a fixed length packet by adding the second identifier produced by said identifier producing means to the information field produced by said information multiplexing means.

16. A multiplexing apparatus for multiplexing fixed length packets transmitted in a common network, the apparatus comprising:

detecting means for detecting a second identifier from a fixed length packet that includes an information field relating to multiplexed information fields of a plurality of fixed-length packets with different path identifiers transmitted along the same path, and the second identifier that represents in common the first identifier assigned to said plurality of fixed-length packets transmitted along the same path direction;

separating means for separating said multiplexed information fields included in an information field of said fixed length packet together with said second identifier; and reproducing means for reproducing said original fixed-length packets by adding said first identifier to each information field separated by said separating means.

17. An apparatus for transmitting a fixed length packet having a header and information, the apparatus comprising:

receiving means for said fixed length packet;

information multiplexing means for multiplexing the information of a plurality of said fixed-length packets with different path identifiers transmitted along the same path;

multiplexing information adding means for adding a header, together with multiplexing information indicating that information is multiplexed by said information multiplexing means, to said information multiplexed; and transmitting means for transmitting a fixed length packet produced by said multiplexing information adding means.

18. An apparatus for transmitting a fixed length packet consisting of a header and information; the apparatus comprising:

receiving means for receiving a fixed length packet having information provided by multiplexing information of a plurality of said fixed length packets with different path identifiers transmitted along the same path, and a header together with an identifier that indicates information of a plurality of said fixed-length packets is multiplexed;

separating means for separating said multiplexed information of said fixed-length packets;

header adding means for adding a header to each information separated by said separating means; and transmitting means for transmitting a plurality of fixed length packets produced by said header adding means.

* * * * *